US008477122B2

(12) United States Patent
Takagi

(10) Patent No.: US 8,477,122 B2
(45) Date of Patent: Jul. 2, 2013

(54) DISPLAY APPARATUS, DISPLAYING METHOD AND COMPUTER READABLE MEDIUM

(75) Inventor: Tomohito Takagi, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1061 days.

(21) Appl. No.: 11/944,966

(22) Filed: Nov. 26, 2007

(65) Prior Publication Data

US 2008/0218524 A1     Sep. 11, 2008

(30) Foreign Application Priority Data

Mar. 8, 2007     (JP) .................................. 2007-058221

(51) Int. Cl.
*G06F 3/038* (2006.01)

(52) U.S. Cl.
USPC .......................................................... 345/204

(58) Field of Classification Search
USPC ........................... 345/522, 501, 156, 157, 173
See application file for complete search history.

(56) References Cited

U.S. PATENT DOCUMENTS

| 6,791,530 B2 * | 9/2004 | Vernier et al. ................. 345/156 |
| 2004/0160427 A1 * | 8/2004 | Keely et al. .................... 345/179 |
| 2005/0024341 A1 * | 2/2005 | Gillespie et al. ............... 345/173 |
| 2006/0132501 A1 * | 6/2006 | Nonaka et al. ................. 345/619 |
| 2007/0273663 A1 * | 11/2007 | Park et al. ...................... 345/173 |
| 2008/0001924 A1 * | 1/2008 | de los Reyes et al. ........ 345/173 |

FOREIGN PATENT DOCUMENTS

| JP | A-05-181437 | 7/1993 |
| JP | A-2000-194474 | 7/2000 |
| JP | A-2003-263256 | 9/2003 |
| JP | A-2004-109402 | 4/2004 |
| JP | A-2004-206577 | 7/2004 |
| JP | A-2004-259247 | 9/2004 |
| JP | A-2005-228102 | 8/2005 |
| JP | A-2006-185025 | 7/2006 |

OTHER PUBLICATIONS

English language translation of Office Action dated Dec. 6, 2011 in Japanese Application No. 2007-058221.

* cited by examiner

*Primary Examiner* — William Boddie
*Assistant Examiner* — Jeffrey A Parker
(74) *Attorney, Agent, or Firm* — Oliff & Berridge, PLC

(57) ABSTRACT

The display apparatus is provided with: a display that displays a raw image and an identification image by which an electronic document is identifiable within a screen including at least two areas, the raw image representing a content of the electronic document, the identification image being smaller than the raw image; a detection unit that detects a moving operation of the raw image displayed in a first area to a second area that is different from the first area; and a controller that controls the display to display the identification image in the second area in response to the detection by the detection unit.

30 Claims, 32 Drawing Sheets

TOUCH

NON DISPLAY / HIDING

DISPLAY / CALLED BACK

REMOVE FINGER

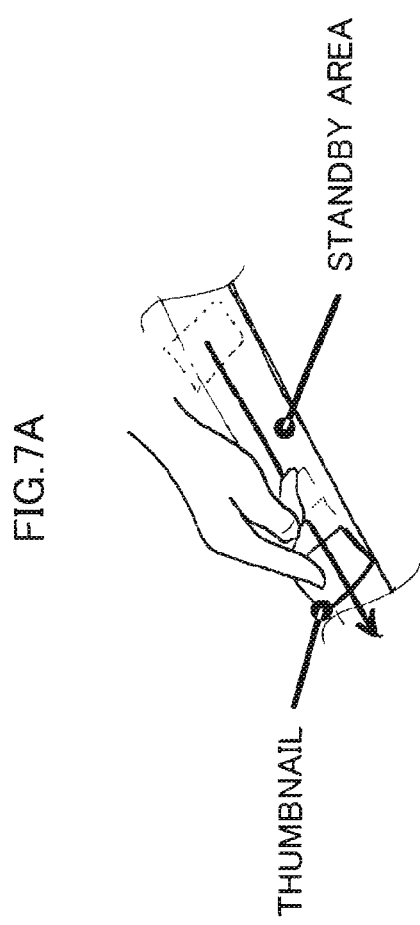
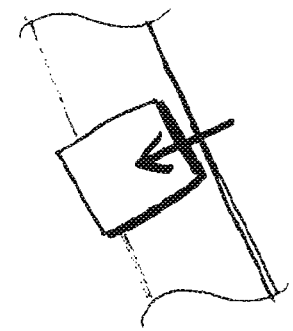
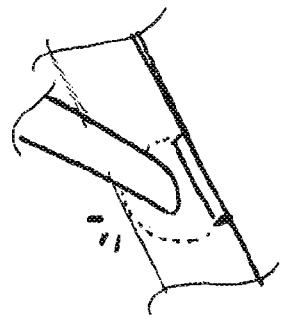
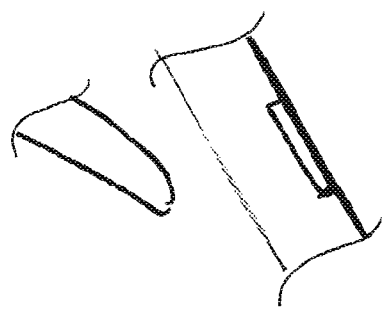

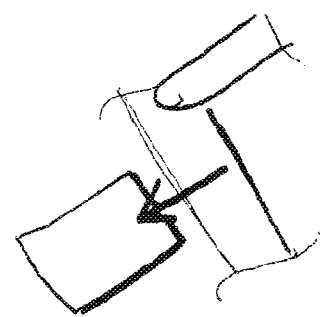
FIG.8G
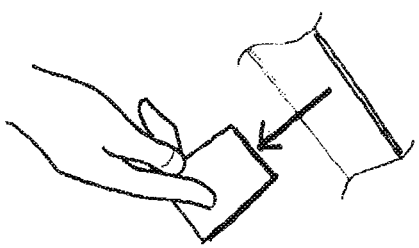
FIG.8C
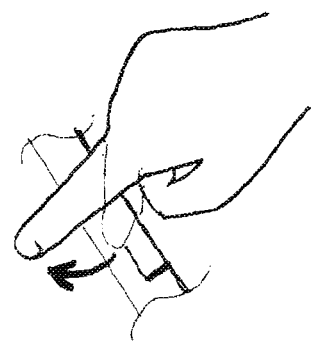
FIG.8F
FIG.8B
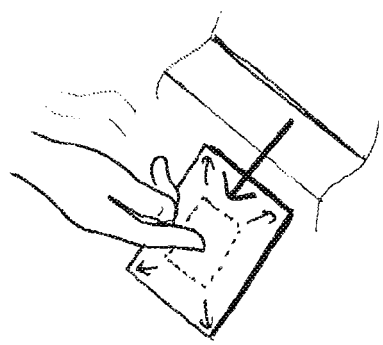
FIG.8E
FIG.8A
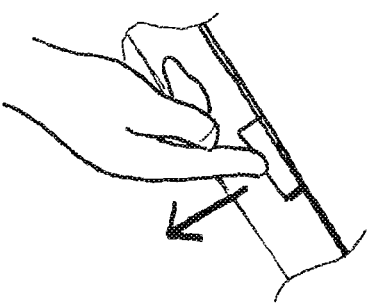
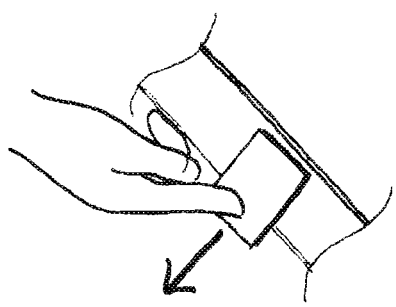
FIG.8D

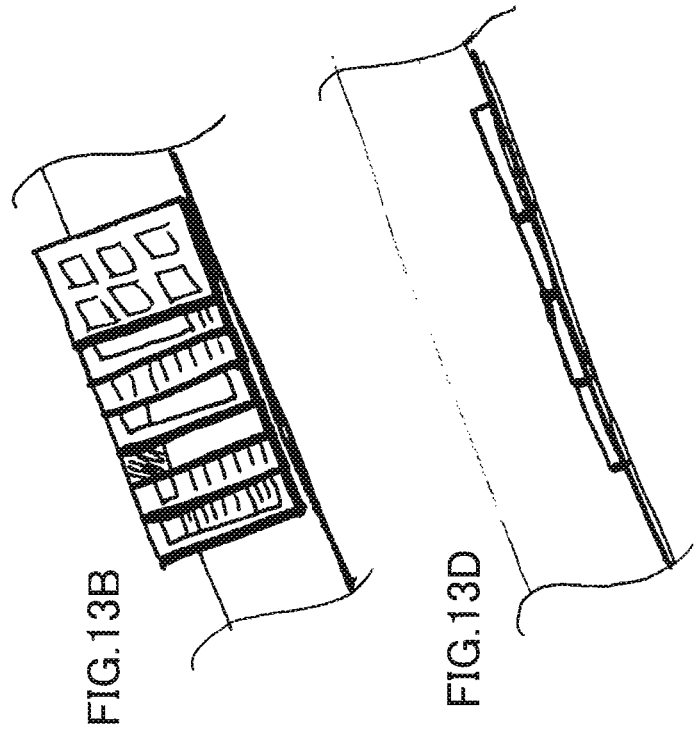
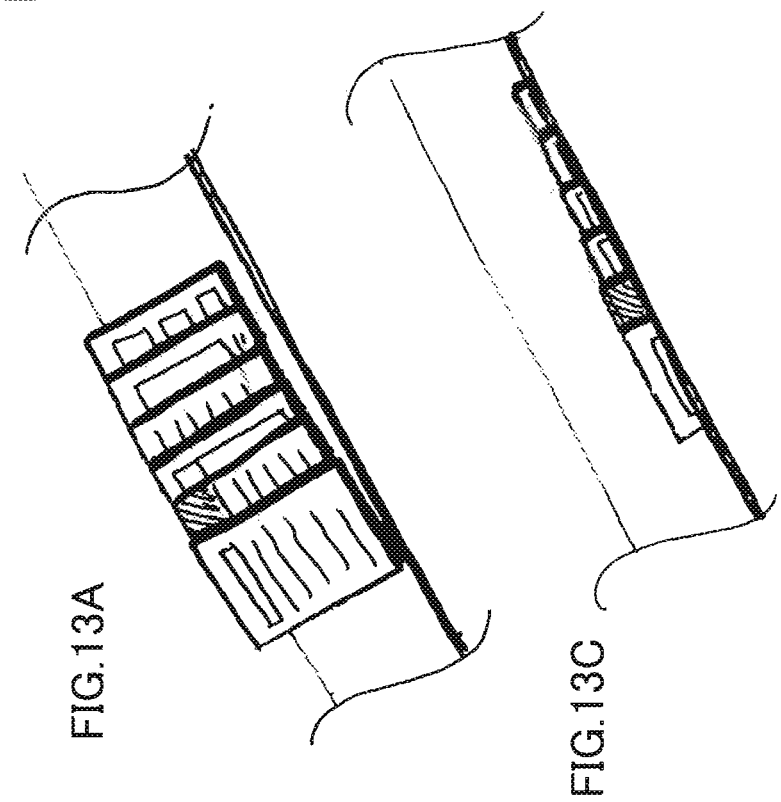

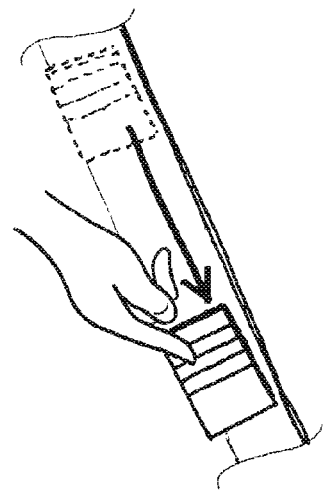
FIG.14C
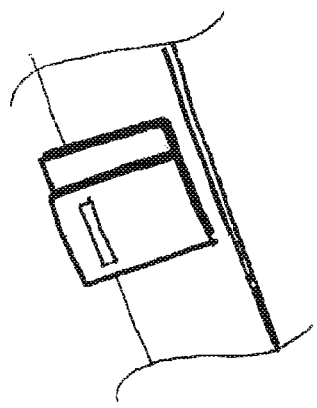
FIG.14B
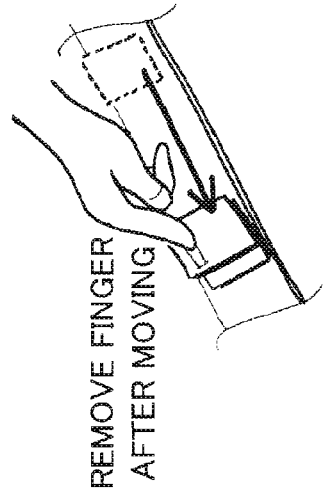
FIG.14A
REMOVE FINGER AFTER MOVING
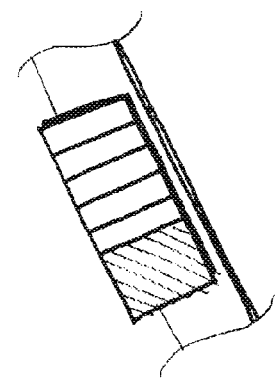
FIG.14G
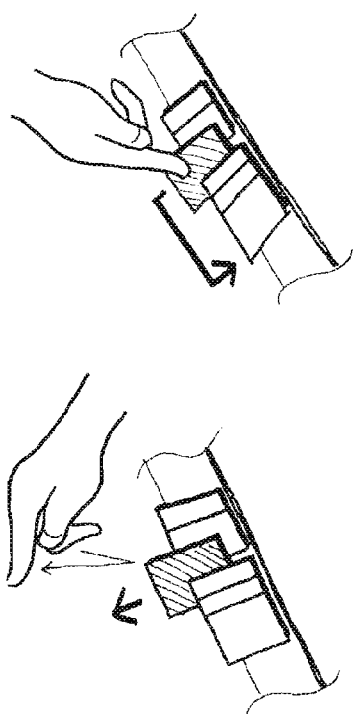
FIG.14F
FIG.14E
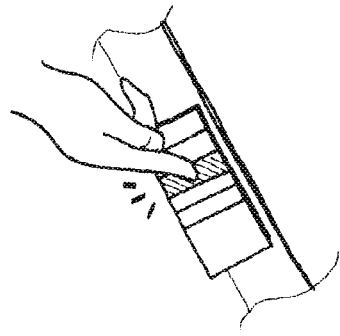
FIG.14D

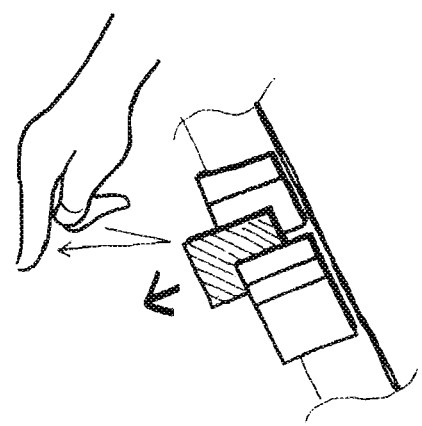
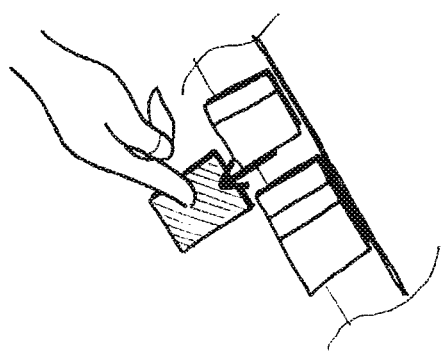
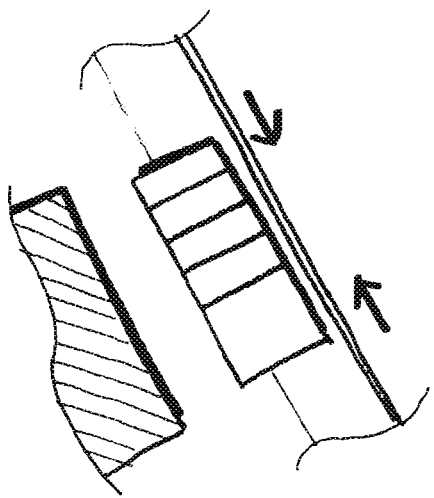

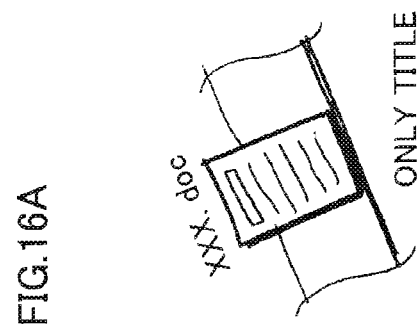
FIG.16A ONLY TITLE
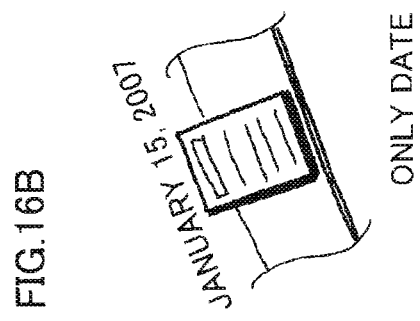
FIG.16B ONLY DATE
FIG.16C DISPLAY BOTH TITLE AND DATE
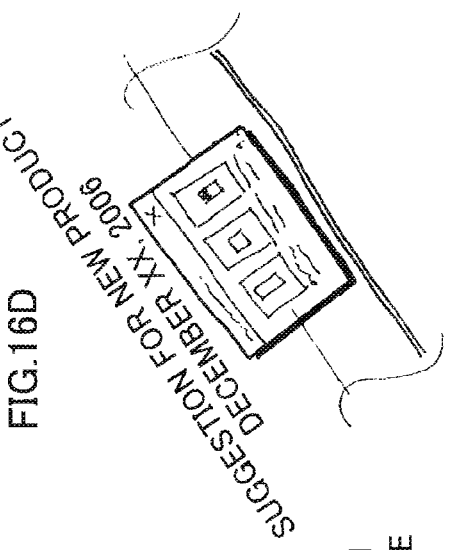
FIG.16D

MARK LINE CORNER FOLDED DOWN

MARK OF CHECK

STICKY NOTE

CONTINUOUS TOUCHES

GOING DOWN TO DEEPER TIER ACCORDING TO THE NUMBER OF TOUCH

LEFT ONE IS IMPORTANT DOCUMENT

RIGHT ONE IS DESIRED TO BE MORE IMPORTANT THAN LEFT ONE

RIGHT ONE IS DISPLAYED AS DOCUMENT MORE IMPORTANT THAN LEFT ONE

FIG.25A

| AREA ID | COORDINATES INFORMATION | TYPE |
|---|---|---|
| P001 | (Ax,Ay),(Dx,Dy) | WORKING AREA |

FIG.25B

| IMAGE ID | COORDINATES INFORMATION | FLAG | DOCUMENT ID |
|---|---|---|---|
| Q001 | (E1x,E1y),(F1x,F1y),(G1x,G1y) | 0 | R001 |
| Q002 | (E2x,E2y),(F2x,F2y),(G2x,G2y) | 1 | R002 |
| Q003 | (E3x,E3y),(F3x,F3y),(G3x,G3y) | 2 | R003 |
| ⋮ | ⋮ | ⋮ | ⋮ |

FIG.25C

| DOCUMENT ID | ASSOCIATED DOCUMENT ID |
|---|---|
| R001 | R101,R102,R103 |
| R002 | R201,R202 |
| ⋮ | ⋮ |

DISPLAY APPARATUS, DISPLAYING METHOD AND COMPUTER READABLE MEDIUM

CROSS REFERENCE TO RELATED APPLICATIONS

This application is based on and claims priority under 35 USC §119 from Japanese Patent Application No. 2007-58221 filed Mar. 8, 2007.

BACKGROUND

1. Technical Field

The present invention relates to a display apparatus, a displaying method and computer readable medium storing a program causing a computer to execute a process for displaying an image.

2. Related Art

There is a known table type information terminal provided with a screen on a table surface for displaying a content list, contents selected by the content list and the like by a projection device in a table (for example, refer to Japanese Unexamined Patent Application Publication No. 2005-228102).

SUMMARY

According to an aspect of the invention, there is provided a display apparatus including: a display that displays a raw image and an identification image by which an electronic document is identifiable within a screen including at least two areas, the raw image representing a content of the electronic document, the identification image being smaller than the raw image; a detection unit that detects a moving operation of the raw image displayed in a first area to a second area that is different from the first area; and a controller that controls the display to display the identification image in the second area in response to the detection by the detection unit.

BRIEF DESCRIPTION OF THE DRAWINGS

Exemplary embodiment(s) of the present invention will be described in detail based on the following figures, wherein:

FIGS. 3A, 3B and 3C show a basic manner when the original image of the electronic document is thumbnailed and the thumbnail is made to stand by;

FIGS. 7A, 7B, 7C and 7D are diagrams showing additional examples to the basic manner according to the exemplary embodiment;

FIGS. 8A, 8B, 8C, 8D, 8E, 8F and 8G are diagrams showing additional examples to the basic manner according to the exemplary embodiment;

FIGS. 13A, 13B, 13C and 13D are diagrams showing examples of the expression of the thumbnail in the standby area of the exemplary embodiment;

FIGS. 14A, 14B, 14C, 14D, 14E, 14F and 14G are diagrams showing examples of the expression of the thumbnail in the standby area of the exemplary embodiment;

FIGS. 15A, 15B and 15C are diagrams showing examples of the expression of the thumbnail in the standby area of the exemplary embodiment;

FIGS. 16A, 16B, 16C, and 16D are diagrams showing examples of the expression of the thumbnail in the standby area of the exemplary embodiment;

FIG. 25A is a diagram showing a specific example of information that is stored in the area position storing unit;

FIG. 25B is a diagram showing a specific example of the information that is stored in the image position storing unit;

FIG. 25C shows an example of the information that is stored in the associated information storing unit;

FIG. 27 is a flowchart showing a flow of the process at the time of touch ON;

DETAILED DESCRIPTION

Hereinafter, with reference to the attached drawings, a detailed description will be given to the best mode for carrying out the present invention (hereinafter, referred to as the exemplary embodiment).

<A Mechanism of a Table Type Display Apparatus>

In the present exemplary embodiment, as an example of a display apparatus of the present invention, a table type display apparatus to be surrounded by plural users for discussion or the like is used. First of all, a description will be given to a mechanism of the table type display apparatus.

Figure 1:
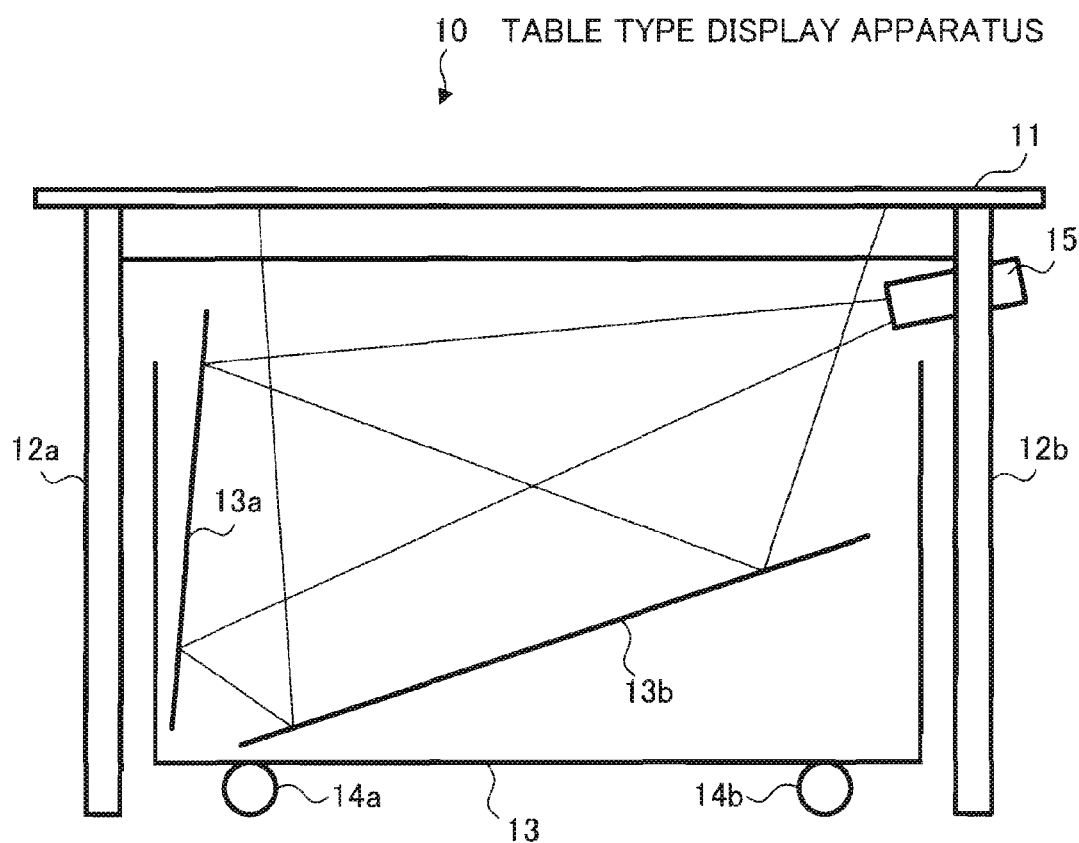
FIG. 1 is a cross sectional view of the table type display apparatus according to the exemplary embodiment.

FIG. 1 is a cross sectional view of the table type display apparatus according to the present exemplary embodiment of this invention.

As shown in the figure, the table type display apparatus 10 is provided with a tabletop 11 serving as a working table for discussion or the like, and leg portions 12a to 12d that support the tabletop 11. The table type display apparatus 10 is also provided with a projection unit 13 that projects an image from a back surface to the tabletop 11, casters 14a to 14d that support and freely move the projection unit 13, and a projector 15 that projects an image to be projected to the tabletop 11. However, since FIG. 1 is a cross sectional view, the leg portions 12c and 12d, and the casters 14c and 14d are not shown in the figure.

As the tabletop 11, for example, a tabletop with a round shape is used so that users may stand at arbitrary positions around the tabletop 11 and join the discussion or the like. Further, an opaque white semi-transparent filter is adhered to a substrate such as a glass plate so as to function as a display screen that displays an image projected by the projection unit 13. That is, in the present exemplary embodiment, the tabletop 11 is used as an example of a display of the present invention. Furthermore, the tabletop 11 has a function as a touch panel that detects an operation, such as a moving operation and a returning operation, by users to the displayed image. Here, the touch panel may be realized by covering a surface of the tabletop 11 with a transparent screen in which elements for detecting a touch are arranged, or by making infrared light run vertically and horizontally on the surface of the tabletop 11 in order to detect a position where the light is interrupted.

Although the leg portions 12a to 12d are an example in the case of adopting four legs, the number of the leg portions is not limited thereto.

The projection unit 13 is formed by a box of a quadrangular prism of which top facing the tabletop 11 is open, and is provided with mirrors 13a and 13b inside thereof. Here, the mirrors 13a and 13b are fixed at angles as shown in the figure, and attached to a side surface of the box of the projection unit 13.

The casters 14a to 14d are attached to a bottom surface of the projection unit 13 so as to move the projection unit 13 in response to movement of the table including the tabletop 11, the leg potions 12a to 12d and the projector 15. In addition, a relative position of the protection unit 13 to the table should not be displaced. Here, although the casters are four in this case, the number of casters is not limited thereto.

The projector 15 is suspended from the back surface of the tabletop 11, fixed under the tabletop 11 and projects an image in the direction of the mirror 13a. The image is reflected by the mirror 13b and projected to the tabletop 11.

Although the table type display apparatus 10 is shown as an example here, in the present exemplary embodiment, not only the table type but also a display apparatus with any shape may be applied.

A Summary of the Present Exemplary Embodiment

Next, a description will be given to a summary of the present exemplary embodiment.

First of all, a general situation where some people hold a meeting is considered. When discussion, review or explanation (hereinafter, referred to as "discussion or the like") is held in such a situation, while placing paper documents on a table or the like, it is usual that the paper documents that are focus of the discussion or the like are placed on the center of the table. Meanwhile, paper documents that are not the focus of the discussion or the like are placed aside. The paper documents placed aside become preliminary materials that are referable again and stand by until they are referred again.

In the meeting joined by some people, there may be a trouble felt in the following point.

First of all, while there are few cases where only one sheet of paper document is used in such a meeting, a large number of paper documents are handled and utilized for comparative discussion or the like in most cases. Further, various kinds of paper documents are handled such as plural sheets of unfinished paper documents at a rough draft level, miscellaneous paper documents that are associated with the paper documents that are mainly used. However, since a size of the table or the like is limited, the number of the paper documents placed thereon at the same time is constrained by the size.

Therefore, since the discussion or the like proceeds while many sheets of paper documents are placed on the table or the like, it may be difficult to find the paper document that is the focus of the discussion or the like. In addition, it may also be difficult to understand which paper document is associated with the paper document that is the focus of the discussion. Further, it is not easy to compare the paper documents each other.

Therefore, in order to make it easier to find the paper document that is the focus of the discussion or the like, as mentioned above, the paper documents that are not used are placed aside. However, it is not easy to select the paper documents that are not used from a large number of paper documents and place the paper documents aside. With just placing them aside, it may take time to find out the paper documents when there is a need for referring to the paper documents.

The trouble in the discussion or the like with using the paper documents also happens in discussion or the like with using a table type display apparatus 10 in FIG. 1. That is, in a situation where a large amount of electronic documents are dealt with at the same time, since an area on which the electronic documents are displayed at the same time is constrained, the same problem as mentioned above is assumed.

Therefore, when the table type display apparatus 10 in FIG. 1 is used, an environment is required in which the electronic documents that are not currently used are placed aside, the electronic document that is the focus of the discussion or the like is displayed in a way easy to find, and associated documents that are required and electronic documents that are used for another topic are called up instantaneously.

The present exemplary embodiment is to temporarily move the electronic documents that are thought to be hindrances to another place by displaying a large number of electronic documents or one electronic document in a large size on a screen of the table type display apparatus 10 in FIG. 1.

First of all, a description will be given to an area provided in the table type display apparatus 10.

Figure 2:
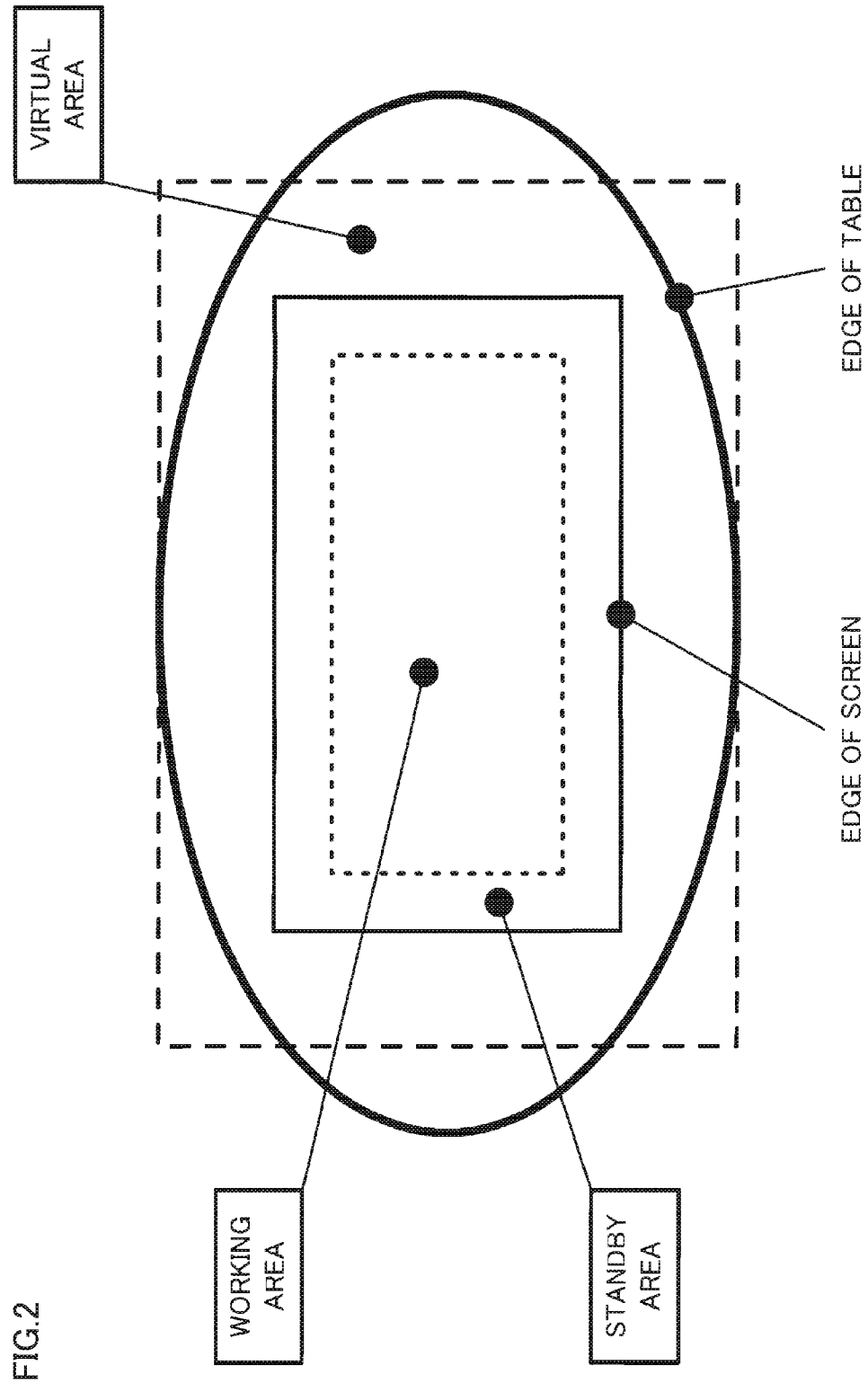
FIG. 2 is a view in which the table type display apparatus is seen from the top.

FIG. 2 is a view in which the table type display apparatus 10 is seen from the top.

In the figure, an edge of the table (outline of the tabletop 11) is represented by a bold solid line. Here, although the shape of the table is oval, the shape does not have to be oval and may be accepted to be, for example, round or rectangle.

Further, a screen is provided inside of the tabletop 11 here. In the figure, an edge of the screen is represented by a thin solid line. Since an image that represents an electronic document (hereinafter, simply referred to as "electronic document" sometimes) is displayed on the screen, an area within the screen is a "display area." Here, although the shape of the screen is rectangular in this case, the shape does not have to be rectangular. For example, the shape may be oval along the shape of the table or any other shapes.

In the present exemplary embodiment, the "display area" is divided into a "working area" and a "standby area." In the figure, a borderline between the working area and the standby area is shown by a dotted line.

The working area is an area where an image of the electronic document being the focus of the discussion or the like is arranged. Here, the image of the electronic document that is the focus of the discussion or the like is displayed as an image having such a size that plural users may read a content thereof on the table (hereinafter, referred to as an "original image"). In the present exemplary embodiment, the original image is used as an example of a raw image that represents the content of the electronic document. However, "original" indicates that the image is not yet thumbnailed as described later. For example, one page of the electronic document displayed within a window is thought to be the original image. However, the original image may be a part of the page of the electronic document displayed within the window by changing its window size after forming one page of the electronic document within the window.

The standby area is an area that is used to make an image of an electronic document which is not the focus of the discussion or the like stand by. The image of the electronic document that stands by in the standby area is displayed as a thumbnail image that is a reduced image of the electronic document so that a summary of a content of the electronic document may be recognized (hereinafter, simply referred to as a "thumbnail"). In the present exemplary embodiment, the thumbnail is used as an example of an identification image that identifies the electronic document and is smaller than the raw image. Alternatively, not the thumbnail but an icon may be used as such an identification image. Further, there may be a case where a part of a thumbnail that stands by is hidden in a virtual area described later. Further, the standby area also serves as a trigger for thumbnailing the original image.

In the figure, the working area is provided on the center of the display area and the standby area is to be a continuous area of a peripheral part of the working area. This is because, taking into consideration that the electronic document being the focus of the discussion or the like is generally placed on the center of the display area, it is natural that the electronic documents that are not the focus of the discussion or the like are placed aside. However, a positional relation between the working area and the standby area is not constrained to the relation mentioned above. For example, the standby area may be provided on the center of the display area and the working area may be provided in a peripheral part of the standby area. A detailed description will be given to a mode of the standby area later.

Next, a description will be given to a non-display area that is located outside of the display area.

The non-display area is an area that is not displayed on the screen. For example, since the non-display area is only a measure of a buffer or the like when virtually hiding the thumbnail that stands by in the standby area, the non-display area is called as a "virtual area." In the figure, the virtual area is represented by a broken line.

In the present specification, electronic data serving as a source of an image recorded on a memory medium such as paper is described as an "electronic document." However, the implication of the "electronic document" is not limited to computerized data of a "document" including texts. For example, the "electronic document" includes image data such as a picture, a photograph and a drawing (irrespective of raster data or vector data), data recorded by database management software or spreadsheet software, and other printable electronic data.

Hereinafter, a specific description will be given to an operation of causing the electronic document to stand by and calling the electronic document back when the electronic document becomes necessary on the screen of the table type display apparatus 10.

<A Basic Manner>

First of all, a description will be given to a basic manner that is the most basic process in such an operation.

Figure 3A:
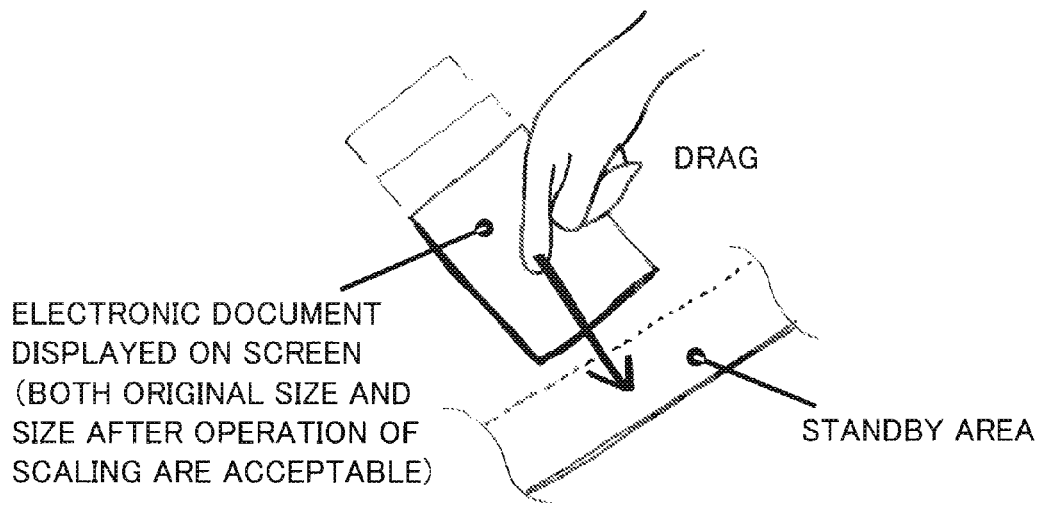
Figure 3B:
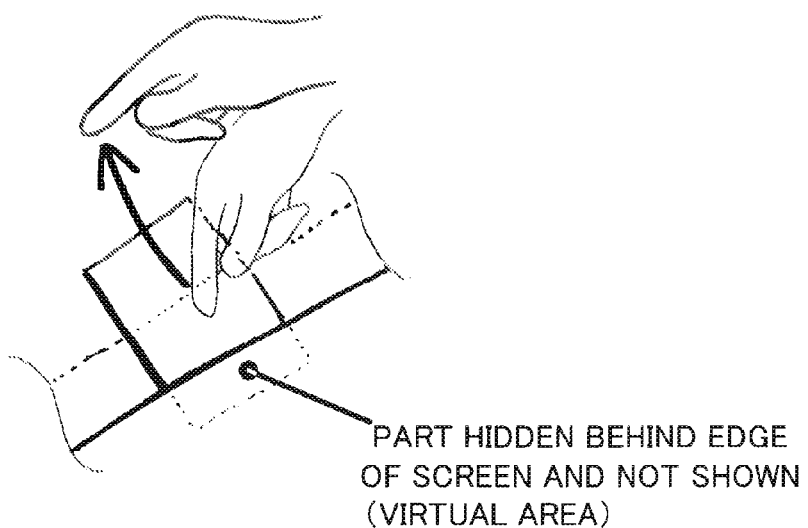
Figure 3C:
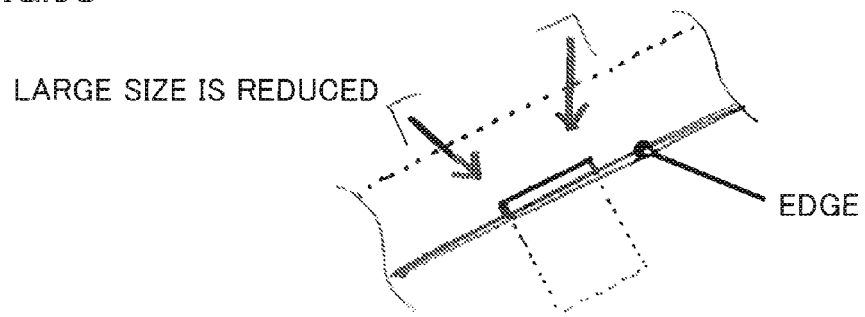

FIGS. 3A, 3B and 3C show a basic manner when the original image of the electronic document is thumbnailed and the thumbnail is made to stand by.

First of all, as shown in FIG. 3A, the original image of the electronic document desired to stand by is moved to the standby area while touched by a finger. As shown in FIG. 3B, when the finger touching the original image comes to the standby area, the finger is removed. Then, as shown in FIG. 3C, the original image is thumbnailed and hidden behind the edge of the screen at the position so that the thumbnail is slightly shown. At this time, for example, apart of the upper side of the thumbnail of the electronic document is slightly shown and the thumbnail is arranged in such a manner that the longitudinal direction thereof is perpendicular to the edge of the screen.

Figure 4A:
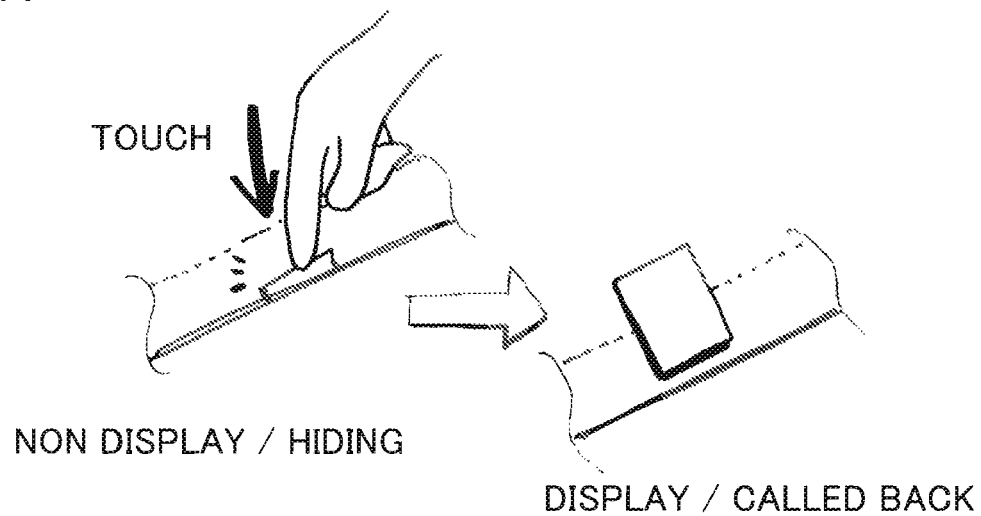
FIGS. 4A and 4B show a basic manner when the thumbnail of the electronic document is called back.
Figure 4B:
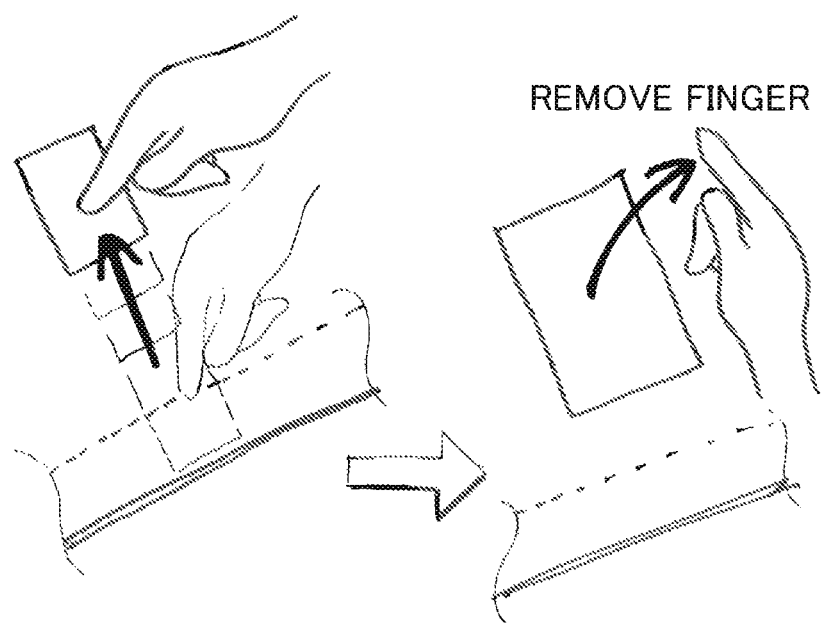

FIGS. 4A and 4B show a basic manner when the thumbnail of the electronic document is called back.

First of all, as shown in FIG. 4A, when the hidden thumbnail is touched once with a finger, the entire thumbnail is called back. As shown in FIG. 4B, in a state where the entire thumbnail is shown, the thumbnail is moved to the working area while touched with a finger and the finger is removed in the working area. Then, the original image of the electronic document is displayed at a position where the finger is removed. The original image of the electronic document is, as mentioned above, not limited to an image having an original size of the electronic document. That is, the original image may be an image having a size just before thumbnailed (if the image is thumbnailed after an operation of scaling, an image is resized by the operation of scaling).

Additional Examples to the Basic Manner

Next, a description will be given to additional examples to each process of the basic manners shown in FIGS. 3A to 4B. FIGS. 5A to 9B are diagrams showing additional examples to the basic manners according to the present exemplary embodiment of this invention.

First of all, the following is an additional example that is related to whole of the figures.

That is, in the basic manners in FIGS. 3A to 4B, a detailed description is not given to a touch position on the image for moving the electronic document. However, the touch position may be any position as long as the position is on the screen.

In the basic manners in FIGS. 3A to 4B, the description that the image of the electronic document is touched and moved with the finger is given. However, the electronic document may be moved by using other pointing devices. The pointing devices include, for example, a pen and a pointer.

Further, the following is an additional example to FIG. 3B.

Figure 5A:
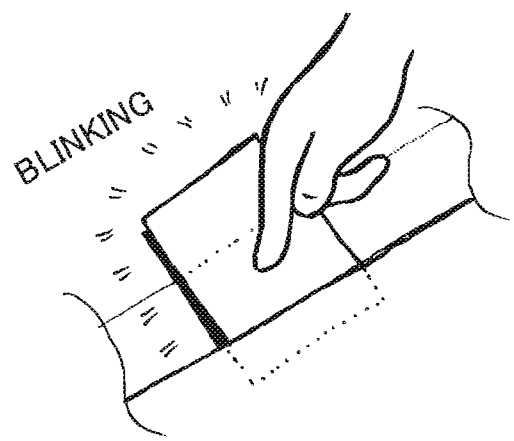
FIGS. 5A, 5B and 5C are diagrams showing additional examples to the basic manner according to the exemplary embodiment.

That is, in FIG. 3B, a detailed description is not given to the position where the finger is removed. However, the finger may be removed at any position as long as the position is within the standby area. When the electronic document is touched and moved with the finger, it may be difficult to understand when the electronic document comes in the standby area in some cases. Therefore, the fact that the electronic document comes in the standby area may be notified by changing a display mode as shown in FIG. 5A. Here, blinking, transparency, change in size, change in color and the like may be considered as the change of the display mode.

In addition, the removal of the finger exemplifies a trigger for thumbnailing at the time of moving from the working area to the standby area. However, any other event may be adopted as the trigger.

Next, a description will be given to an additional example to FIG. 3C.

Figure 5B:
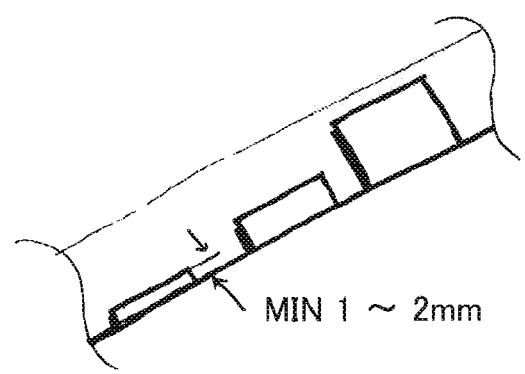
Figure 5C:
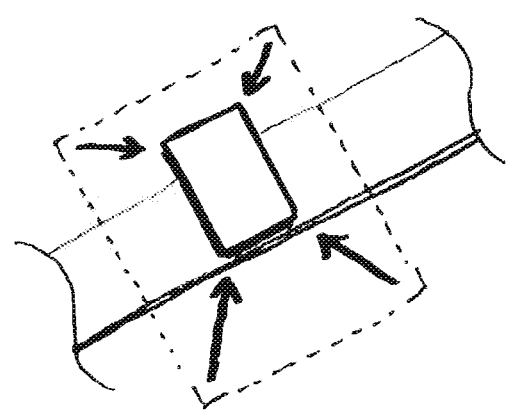

In FIG. 3C, a description is not given to a size of the thumbnail and a size of a hidden part of the thumbnail. But, arbitrary sizes may be adopted for the sizes mentioned above. However, the minimum size of the hidden part of the thumbnail is, as shown in FIG. 5B, required to be the size that the user may confirm (for example 1 (one) to 2 mm). As shown in FIG. 5C, the thumbnail may not be hidden at the beginning and the entire thumbnail may be shown. The user may select and set either the thumbnail being hidden as in FIG. 5B or the entire thumbnail being shown as in FIG. 5C.

Further, in FIGS. 3A to 3C, the displayed original image is dragged in the same direction as the direction of the thumbnail. However, a configuration in which a user drags the original image without being conscious of the display direction may be adopted.

Figure 6A:
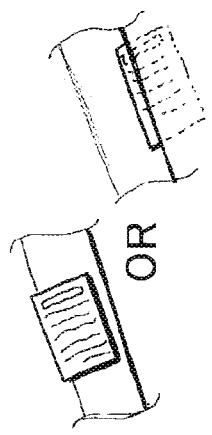
FIGS. 6A, 6B, 6C, 6D and 6E are diagrams showing additional examples to the basic manner according to the exemplary embodiment.
Figure 6B:
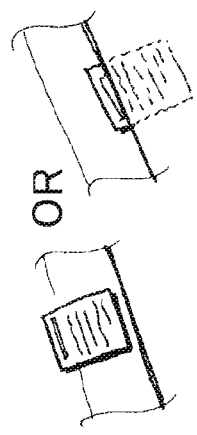
Figure 6C:
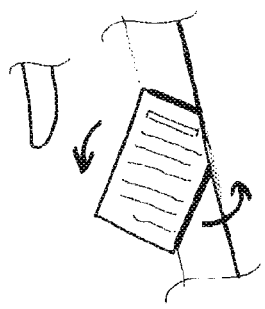

FIGS. 6A, 6B, 6C, 6D and 6E show examples of thumbnailing the original image in this case. That is, as shown in FIG. 6A, the original image is moved to the standby area in an arbitrary direction. As shown in FIG. 6B, when the finger is removed at the time of coming into the standby area, the image is thumbnailed with automatically aligning the direction as shown in FIG. 6C. After that, as a result, the thumbnail is displayed in such a manner that an axis thereof is perpendicular to the edge of the screen. However, the lower side of the electronic document is not always located at a position in the vicinity of the edge of the screen or a position where the lower side is hidden behind the edge of the screen.

Figure 6D:
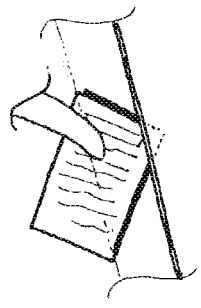
Figure 6E:
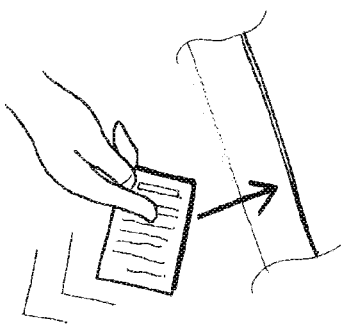

FIGS. 6D and 6E are thought to be a specific display of the thumbnail at this time. FIG. 6D is an example of the case where an axis of the thumbnail in the lateral direction is perpendicular to the edge of the screen. FIG. 6D shows an example of the case where a rotation angle of the thumbnail is minimum and the axis thereof is perpendicular to the edge of the screen when the original image in an arbitrary direction is dragged. FIG. 6E is an example of the case where an axis of the thumbnail in the longitudinal direction is perpendicular to the edge of the screen. As shown in the basic manner, the image is rotated in such a manner that the lower side of the electronic document is located at a position in the vicinity of the edge of the screen or a position where the lower side is hidden behind the edge of the screen.

Next, a description will be given to an additional example to FIG. 4A.

That is, in FIG. 4A, the description is only given as the thumbnail that is partly shown is touched in order to call the entire thumbnail back. However, a reverse operation may be performed. That is, the thumbnail may be touched again in a state where the thumbnail is entirely shown so that the thumbnail is hidden again behind the edge of the screen. At this time, only the originally hidden part of the thumbnail is to be hidden. However, as shown in FIG. 7A, when within the standby area, the thumbnail may be moved while being touched.

Besides, when the thumbnail is hidden behind the edge of the screen, there is a case where it is difficult to touch the thumbnail with the finger in such a state. In consideration to such a case, there may be a configuration that the thumbnail is not necessarily touched. For example, an area that has the same width as that of the thumbnail and the height of approximately 10 mm may be supplemented as a range to be touched with the finger, and the touch within the range may be regarded as the touch on the thumbnail.

FIGS. 7B to 7D show operational images at this time. FIG. 7B shows a state where it is difficult to touch since the thumbnail is only slightly shown. At this time, as shown in FIG. 7C, a part slightly above the thumbnail may be touched so that the entire hidden thumbnail is called back as shown in FIG. 7D.

Next, a description will be given to an additional example to FIG. 4B.

That is, in FIG. 4B, the description is only given to the case in which the thumbnail being entirely shown is moved to the working area and returned to the original image. However, the thumbnail that is hidden behind the edge of the screen and slightly shown may be returned directly to the original image.

FIGS. 8A to 8C show operational images at this time. That is, as shown in FIG. 8A, the part of the thumbnail slightly shown is touched, and as shown in FIG. 8B, while touching, the finger is moved (dragged) into the working area. As shown in FIG. 8C, the finger is removed within the working area so that the original image of the electronic document is displayed in the working area.

In FIG. 4B, the finger is removed within the working area so that the thumbnail is returned to the original image. However, any event may be adopted as a trigger for returning to the original image at the time of moving from the standby area to the working area. Alternatively, the thumbnail may be returned to the original image at the time of dragging from the standby area to the working area.

FIGS. 8D and 8E show operational images at this time. That is, as shown in FIG. 8D, when the thumbnail is dragged from the standby area, the thumbnail may be returned to the original image at the time of moving away from the standby area as shown in FIG. 8E.

Alternatively, there may be a configuration that the thumbnail is touched and returned to the original image without drag and drop of the thumbnail to a position to be displayed. That is, as shown in FIG. 8F, the thumbnail is touched and the finger is removed while moving in the direction of the working area. However, the position where the finger is removed is to be within the working area. The image of which the thumbnailing is canceled by this operation is, as shown in FIG. 8G, moved in proportion to a movement amount of the finger as if sliding. The thumbnail moved out of the standby area is returned to the original image while moving, and the moving image is gradually stopped as if frictions prevent it from moving.

Figure 9A:
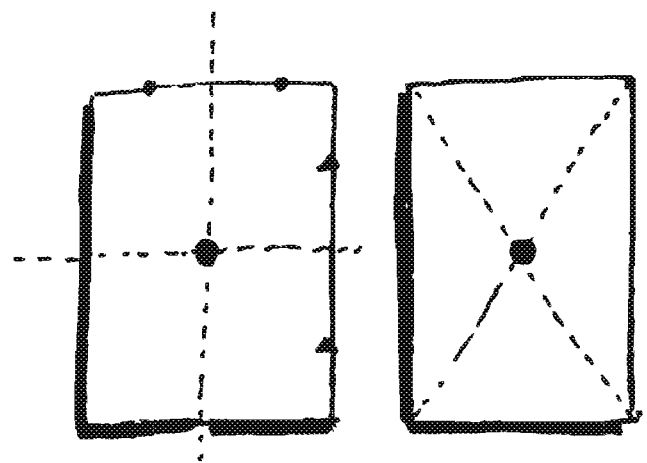
FIGS. 9A and 9B are diagrams showing additional examples to the basic manner according to the exemplary embodiment.
Figure 9B:
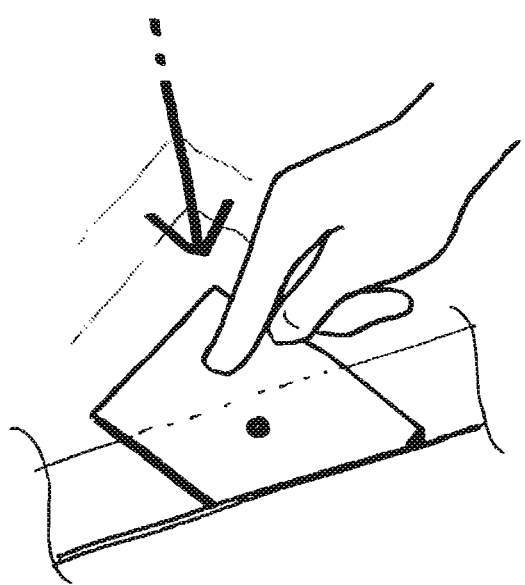

Further, in the basic manner, a reference point for determining whether or not the image is moved into the standby area is a point that is touched with the finger among points on the image of the electronic document. However, any other points may be the reference point. That is, in the basic manner, although the point that is touched with the finger is used as an example of a specified point in a raw image, any other points may be used. For example, as shown in FIG. 9A, a center of the image of the electronic document may be the reference point. In this case, as shown in FIG. 9B, the original image is thumbnailed when a center thereof is moved into the standby area. By so doing, it is easy to take the reference point and it is easy to thumbnail the image even if the user is not conscious of the reference point.

<The Case where a Finger Touching Electronic Document Does Not Reach the Standby Area>

As referred to above, the description is given on the premise that the finger touching the original image reaches the standby area and then the image is thumbnailed. However, there may be a case where the finger touching the original image stops before reaching the standby area. Here, a description will be given to the display of the electronic document at this time.

First of all, in this case, the electronic document is not displayed in the standby area as a thumbnail but moved into the virtual area while holding current size thereof. At this time, a part of the electronic document that is moved into the virtual area is not displayed but hidden.

Figure 10C:
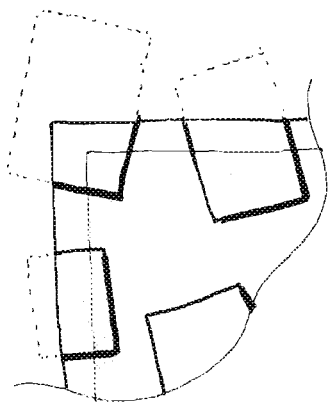
FIGS. 10A, 10B and 10C are diagrams showing examples of the case where the finger touching the electronic document does not reach the standby area in the exemplary embodiment.
Figure 10B:
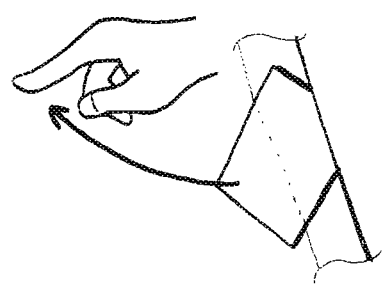
Figure 10A:
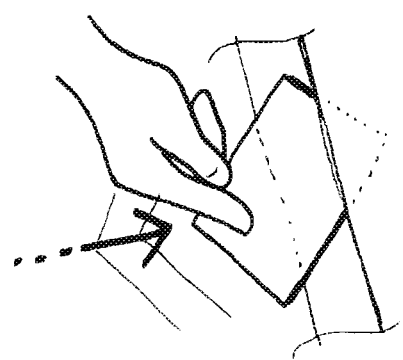

FIGS. 10A, 10B and 10C are diagrams showing examples of the case where the finger touching the electronic document does not reach the standby area in the present exemplary embodiment of this invention. Specifically, FIGS. 10A, 10B and 10C show operational images at this time. First of all, as shown in FIG. 10A, the image of the electronic document is moved to the standby area. At this time, the finger does not reach the standby area. As shown in FIG. 10B, the finger is removed before contacting the standby area. Then, the electronic document is not thumbnailed and remains as it is. As shown in FIG. 10C, the electronic document is hidden into the virtual area with holding the current size.

However, in this case, taking into consideration a size of the image of the electronic documents and a depth of the virtual area, it is necessary to make the image of the electronic document not entirely hidden into the virtual area. Particularly, when the following operation as if sliding the electronic document (hereinafter, referred to "sliding operation") is performed, the image of the electronic document may be entirely hidden. Therefore, the electronic document may be moved into the virtual area only while touching the electronic document.

Meanwhile, when the sliding operation is performed, the image of the electronic document may be to bounce back at a predetermined position so as not to be entirely hidden into the virtual area.

FIGS. 11A, 11B, 11C and 11D are diagrams showing examples of the case where the finger touching the electronic document does not reach the standby area in the present exemplary embodiment of this invention. Specifically, FIGS. 11A, 11B, 11C and 11D show the sliding operation and patterns of bouncing back.

Figure 11A:
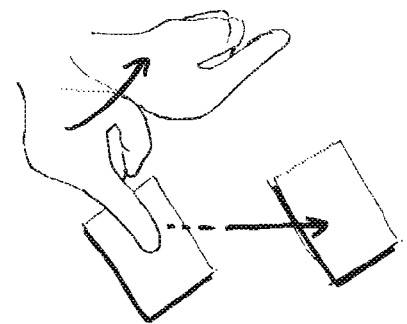
FIGS. 11A, 11B, 11C and 11D are diagrams showing examples of the case where the finger touching the electronic document does not reach the standby area in the exemplary embodiment.

FIG. 11A is an operational image of the sliding operation. That is, the sliding operation is an operation of giving initial velocity (speed and direction) to the original image of the electronic document and moving the original image as if sliding.

Figure 11B:
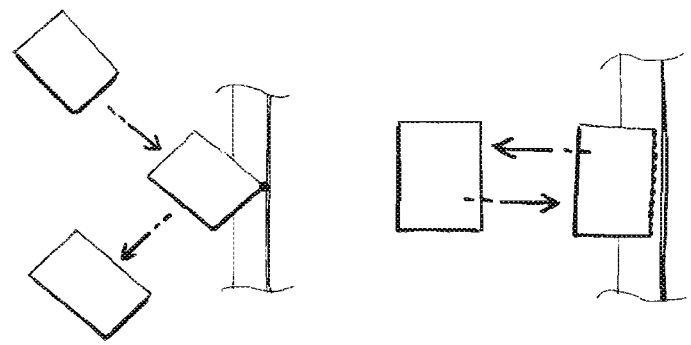

FIG. 11B shows an example of bounce back. When the electronic document is moved by sliding, the electronic document is to bounce back at a framework of the display area. When the image of the electronic document is a tetragon, the electronic document is to bounce back at, for example, any of four sides or any of four vertexes but not limited to the positions.

Figure 11C:
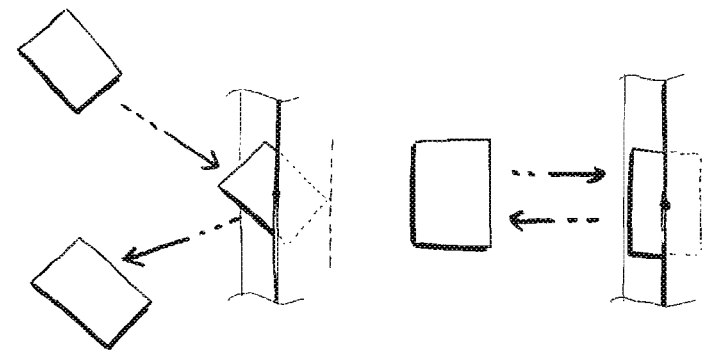
Figure 11D:
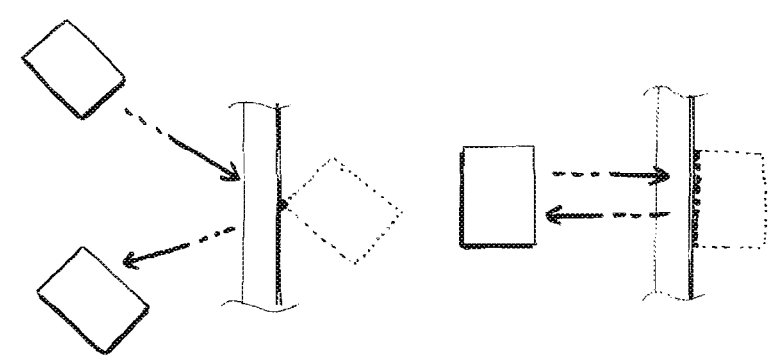

In other cases, as shown in FIG. 11C, the electronic document may be to bounce back when the center of the image of the electronic document is moved to the framework of the display area. As shown in FIG. 11D, the electronic document may be to bounce back when the entire image of the electronic document is hidden into the virtual area (a bouncing back position may be a side or a vertex that is the most distant from the framework of the display area in the image of the electronic document). In the case of FIG. 11C, the virtual area has a depth that has a half length of a diagonal line of the image of the electronic document at minimum, and in the case of FIG. 11D, the virtual area has a depth that has a length of the diagonal line of the image of the electronic document at minimum.

<Size of Thumbnail>

Figure 12C:
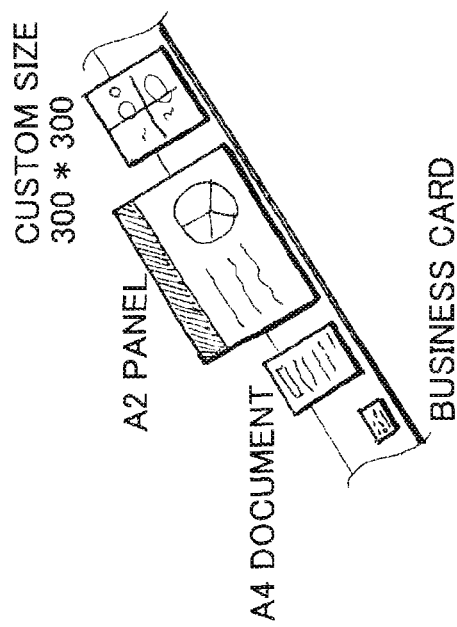
FIGS. 12A, 12B and 12C show examples of the thumbnails displayed in the standby area.
Figure 12B:
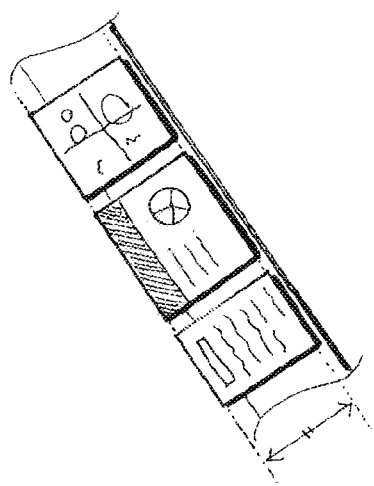
Figure 12A:
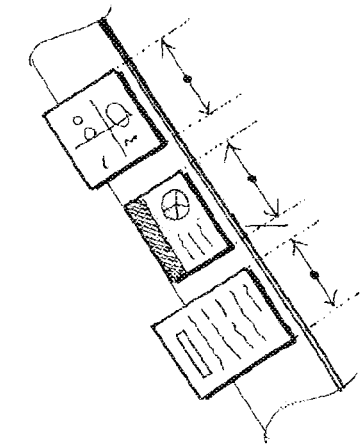

FIGS. 12A, 12B and 12C show examples of the thumbnails displayed in the standby area.

As shown in FIGS. 12A and 12B, a size of the thumbnail may be equalized on the basis of a fixed height or width.

As shown in FIG. 12C, the thumbnail may be displayed in the size that is proportional to the size of the electronic document (such as A4, B4 and A3).

By so doing, with the size and rough layout of the electronic document, it makes it easier to visually search.

<Expression of Thumbnail>

The thumbnails may be displayed by overlapping and integrating each other. However, it is desirable that the thumbnails do not totally overlap each other.

By so doing, operations of ensuring a space for an increasing number of the thumbnails and simply integrating associated documents become easier.

FIGS. 13A to 19E are diagrams showing examples of the expression of the thumbnail in the standby area of the present exemplary embodiment of this invention.

FIGS. 13A, 13B, 13C and 13D show examples of displaying the thumbnails overlapped and integrated.

FIG. 13A is a pattern where a thumbnail on the left side is on the front surface side. FIG. 13B is a pattern where a thumbnail on the right side is on the front surface side. FIG. 13C is a pattern where the lower side of the thumbnail is hidden into the virtual area in a state of FIG. 13A. FIG. 13D is a pattern where the lower side of the thumbnail is hidden into the virtual area in a state of FIG. 13B.

Besides, the display of the thumbnail may be conducted by moving the thumbnail. That is, as shown in FIG. 14A, the thumbnail is moved in the lateral direction within the standby area, and the finger is removed in a state where another thumbnail is overlapped by the thumbnail. Then, as shown in FIG. 14B, the moved thumbnail is on the front surface side and the thumbnails are displayed in a state of overlapped and integrated. The overlapped and integrated thumbnails may be, as shown in FIG. 14C, moved in a state of overlapped and integrated.

Further, when the order of overlapping of the integrated thumbnails is desired to be changed, an operation shown in FIGS. 14D to 14G may be performed.

That is, first of all, as shown in FIG. 14D, the thumbnail whose order of overlapping is to be changed is touched. Here, the touched thumbnail is represented by slanting lines. In practice, however, the touch is notified to the user by some changes of expression such as blinking, color change, and additional framework.

Next, as shown in FIG. 14E, by removing the finger that has touched the thumbnail, the touched thumbnail pops out over the other thumbnails. As shown in FIG. 14F, the thumbnail is dragged in the lateral direction to a position where the order of overlapping is desired to be changed so as to move the thumbnail in parallel.

Then, when the finger touching the thumbnail is removed, as shown in FIG. 14G, the thumbnails are displayed in such a manner that the order of overlapping of the thumbnails is changed.

Further, when one thumbnail among the integrated thumbnails is taken to the working area in the original size (the size before thumbnailed), an operation shown in FIGS. 15A to 15C may be performed.

That is, first of all, as shown in FIG. 15A, the thumbnail to be taken to the working area is touched. Then, by removing the finger, the touched thumbnail pops out over the other thumbnails.

Next, as shown in FIG. 15B, the popping thumbnail is moved upwards (towards the working area) while touching the thumbnail.

Then, when the finger touching the thumbnail is removed, as shown in FIG. 15C, the thumbnail is returned to the original image in the display area. With regard to the integrated thumbnails from which one thumbnail is already taken, a resulting space may be preferably filled.

Although the description is given to the case where one thumbnail among the integrated thumbnails is taken to the working area here, all the integrated thumbnails may be taken to the working area. In this case, without making a state in which only one thumbnail pops out, the integrated thumbnails may be touched and moved upwards (towards the working area) and the finger may be removed.

When the thumbnail is displayed in the standby area, attributes given to the electronic document before thumbnailed may be reflected in the display. In such a case, the display may be conducted on the basis of not only the attributes set in the electronic document before thumbnailed but also attributes set in or given to the electronic document after thumbnailed. In what follows, a description will also be given to a display mode of the thumbnail associated with the attributes.

First of all, the title, the prepared date (the last modified date) of the material and the like may be displayed above (outside of) the thumbnail. When displayed above the thumbnail, the title, the prepared date or the like is displayed even in the case where the thumbnail is hidden and no extra space is required.

Here, information to be displayed has variations such as only a title, only a date, both the title and the date and the like. However, the information may be selected by the user.

FIGS. 16A to 16D show examples of such variations.

A profile such as importance and classification from some points of view may be added to the thumbnailed electronic document. As an example, it is thought that a sticky note, a mark of check or the like is displayed on the corner of the thumbnail so that the profile of the thumbnail may be recognized at first sight.

Figure 17C:
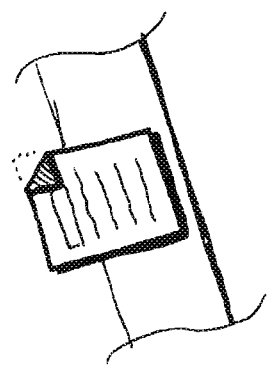
FIGS. 17A, 17B, 17C, 17D, 17E and 17F are diagrams showing examples of the expression of the thumbnail in the standby area of the exemplary embodiment.
Figure 17B:
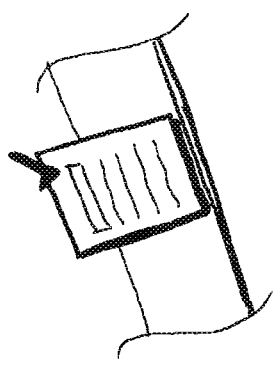
Figure 17A:
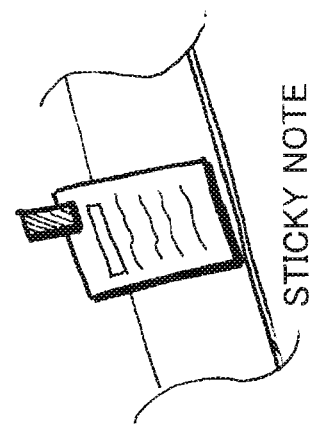

FIGS. 17A to 17C show examples of such a display.

In addition, it is thought that transparency or virtual expression of a depth is used for the thumbnail of the electronic document so as to express the importance or current needs for the document.

Figure 17F:
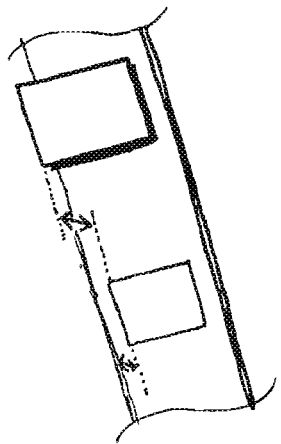
Figure 17E:
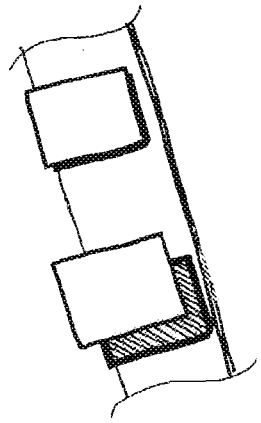
Figure 17D:
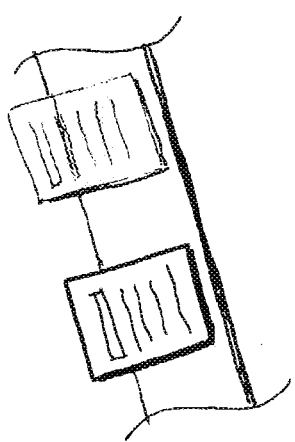

FIGS. 17D to 17F show examples of such a display.

In FIG. 17D, the thumbnail on the right side is expressed as more transparent and shows a weaker presence than the thumbnail on the left side for showing that the thumbnail on the left side is an important document. In FIG. 17E, the thumbnail on the left side appears to be floating more than the thumbnail on the right side for showing that the thumbnail on the left side is an important document. In FIG. 17F, the thumbnail on the left side appears to be sinking more than the thumbnail on the right side for showing that the thumbnail on the right side is an important document.

Although not shown in the figure, a color (brightness or gradation), thickness of outer framework, fineness of a dotted line, a graphic with a folding line or the like may be added to the thumbnail of the electronic document so as to express the importance of the document or the classification from some points of view such as showing that the thumbnail is a document corresponding to keywords. The display modes may be arbitrarily combined, for example, in such a manner that the color (brightness or gradation), or the thickness of outer framework is changed on the basis of the classification from an arbitrary point of view such as the keywords while the importance is expressed by the mark such as the sticky note or the transparency as mentioned above.

Here, a manner that provides the importance may include a manner that determines a depth of layers by the number of continuous touches (the number of click) (continuous touch method or push-in method) and a manner that brings a layer of the thumbnail of an important electronic document upward such that the paper documents are interchanged (document interchange method).

Figure 18A:
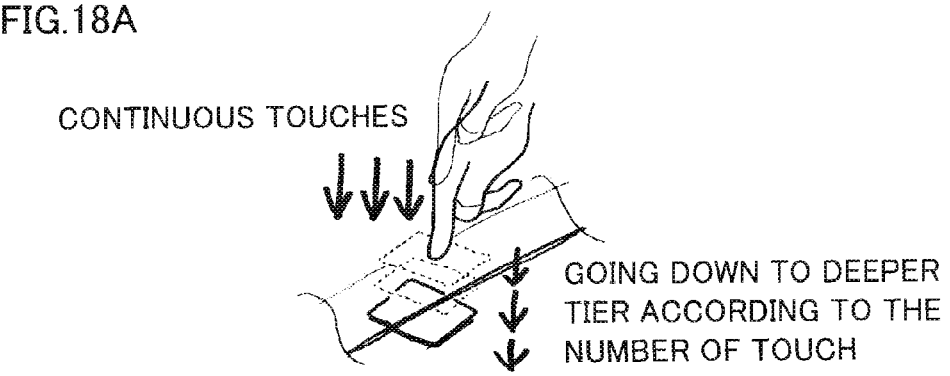
FIGS. 18A, 18B, 18C, 18D and 18E are diagrams showing examples of the expression of the thumbnail in the standby area of the exemplary embodiment.

FIG. 18A shows an operational image of layer change on the importance by the continuous touch method (the push-in method). In the manner, the more times the thumbnail is touched, the lower layer the thumbnail is moved to, namely, to a layer that has lower importance. Such a manner is one that introduces a situation of the importance or the profile of the document as a concept when a meeting is held with placing a variety of paper documents on the table. For example, in the meeting with the paper documents, when plural documents are overlapped each other on the table, there is often a case where the document on the upper side of the overlapping is a higher profile and more important and the document on the lower side overlapped by other documents is less important at that time.

By continuously touching the thumbnail, the document is moved to a lower layer, namely, by expressing that the document is located on the lower side of the overlapping, the overlapping situation of the paper documents, the importance and the profile are expressed by the display of the electronic document.

In the above mentioned display example, the description is given to the case where the lower layer is the layer that is less important. However, conversely, the case where the layer that is more important is the lower layer may be set. In this case, plural touches are thought to be repeated actions of indicating a specified document and the layer that is more important and a higher profile is thought to be the lower layer so that a human action corresponds to the display.

In this way, an intention of a natural human action is interpreted and associated with the operation of continuously touching so that the importance of the document that is continuously touched may be changed. The importance may be expressed by changing the display mode following to the change. As mentioned above, a state where the layer of the electronic document by the continuous touch operation is deep may be more important or conversely less important for the layer.

Figure 18B:
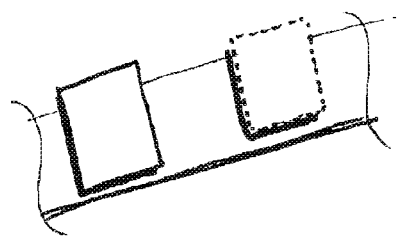
Figure 18C:
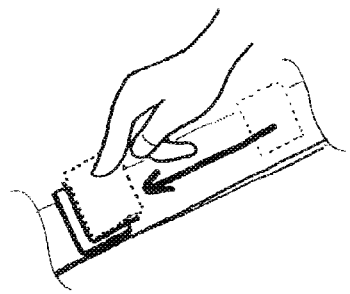
Figure 18D:
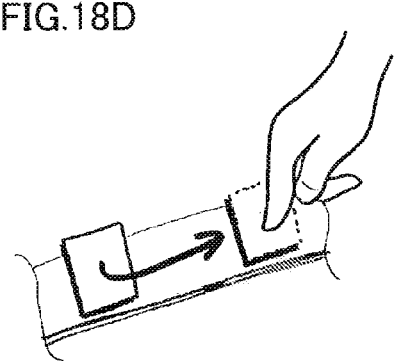
Figure 18E:
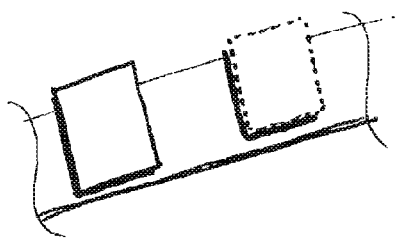

FIGS. 18B to 18E show operational images of layer change on the importance by the document interchange method. At first, as shown in FIG. 18B, it is assumed that the document on the left side is an important document, and the document on the right side is desired to be more important than the document on the left side. In this case, as shown in FIG. 18C, the thumbnail on the left side is overlapped by the thumbnail on the right side. Here, a state of overlapping should be recognized through some expression. After the overlapping as mentioned above, as shown in FIG. 18D, the thumbnail that is originally on the right side is placed at another place. Then, as shown in FIG. 18E, the document on the right side becomes more important than the document on the left side.

Figure 19C:
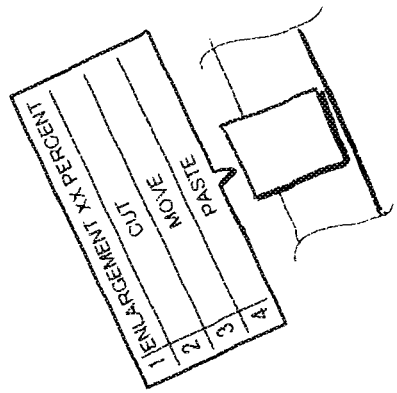
FIGS. 19A, 19B, 19C, 19D and 19E are diagrams showing examples of the expression of the thumbnail in the standby area of the exemplary embodiment.
Figure 19B:
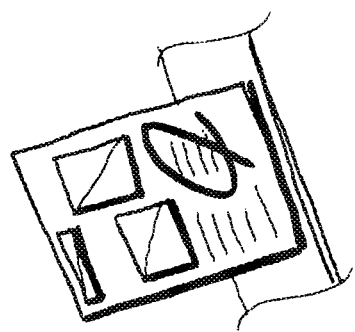
Figure 19E:
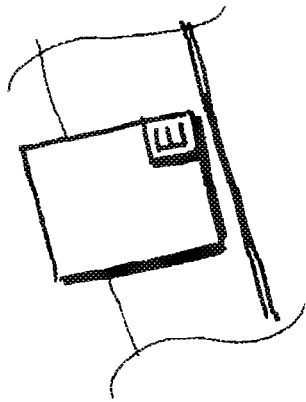
Figure 19A:
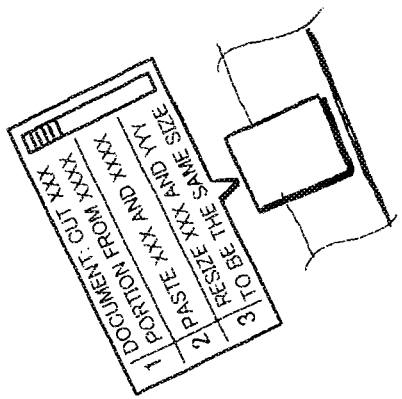

Further, the thumbnail of which edited content in the working area is confirmed may be considered. It should be noted that information for confirming the edited content is divided into several levels in accordance with a level of detail. For example, when the smaller number represents the higher level of detail, following examples are shown:

1. Thumbnail in a case where an edited content is required in detail. For example, as shown in FIG. 19A, the keywords such as "cut" and "paste" may be displayed. Besides, as shown in FIG. 19B, the thumbnail is largely displayed and the edited content may be represented by a predetermined mark. Here, for example, a diagonal line within a tetragon represents the copy and the paste from the other documents and a round mark represents a part that is the focus of the discussion.

2. Thumbnail in a case where a history of the edited content is required. For example, as shown in FIG. 19C, the number of editing action may be displayed.

Figure 19D:
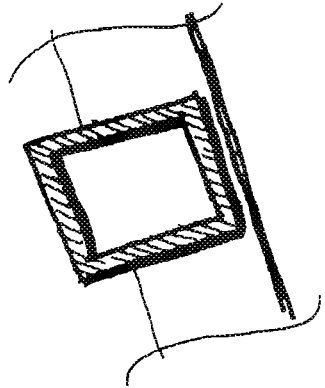

3. Thumbnail in a case where there is a need for distinguishing between the original electronic document and the edited electronic document. For example, as shown in FIGS. 19D and 19E, the editing may be represented by putting the framework or the mark.

<Modes for Standby Area>

There may be several modes for the standby area that displays the thumbnail of the electronic document. FIGS. 20A to 20H are diagrams showing examples of the modes for the standby area according to the present exemplary embodiment of this invention.

1. Edge Mode

Figure 20A:
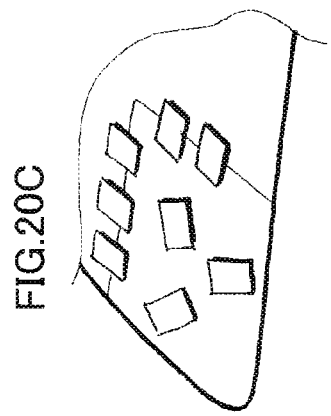
FIGS. 20A, 20B, 20C, 20D, 20E, 20F, 20G and 20H are diagrams showing examples of the modes of the standby area according to the exemplary embodiment.
Figure 20B:
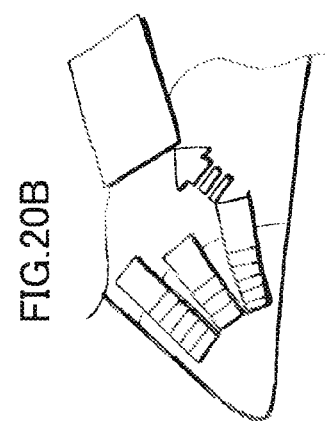

The edge mode is, for example, as shown in FIG. 20A, a basic mode where all the edge of the display screen is the standby area. Since it is thought that the edge of the display screen is the standby area, a shape of the display screen may be any shape such as a tetragon or a circle.

In the edge mode, since the image of the electronic document is thumbnailed only by bringing the image of the electronic document to the edge, it is easy to ensure a space on the table and to arrange the documents by the thumbnails. Since any part of the edge is used, the electronic document is moved to the standby area without being influenced by a standing position around the table.

2. Corner Mode

The corner mode is, for example, as shown in FIGS. 20B to 20H, a mode where the standby area is provided on the corner of the display screen. Although a tetragon having corners is suitable for the shape of the display screen, a circle is also acceptable. When the shape of the display screen is circle, the standby area is provided at several locations.

In the corner mode, since the thumbnails are collected at several locations, it is easy to arrange the documents without spreading out the documents. There are more variations in the display method than the edge mode.

Figure 20C:
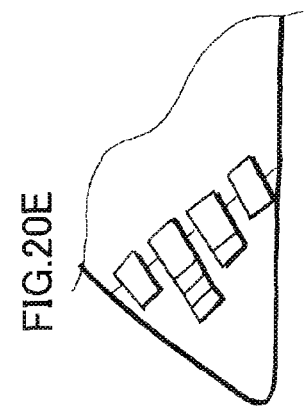
Figure 20D:
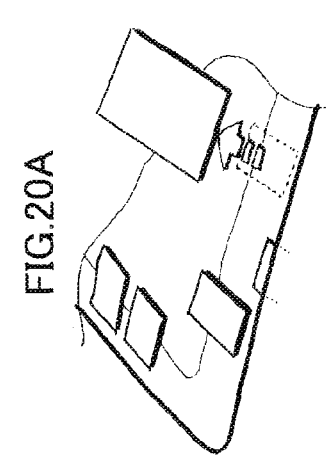
Figure 20E:
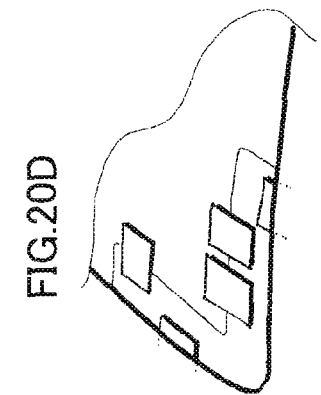
Figure 20F:
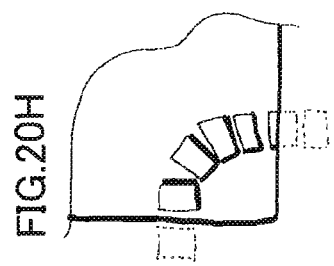
Figure 20G:
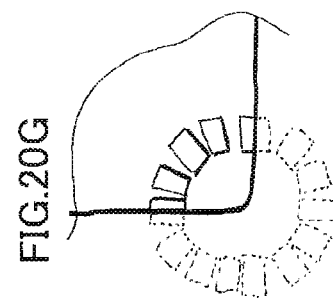
Figure 20H:
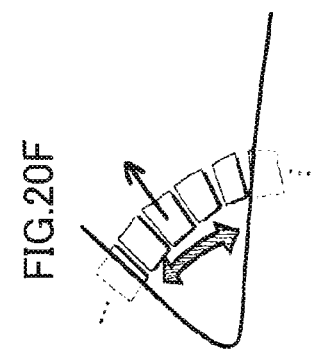

Among the variations of the corner mode shown in FIGS. 20B to 20H, the mode in FIG. 20C is for pooling and causing the thumbnails to float, and the modes in FIGS. 20F to 20H are like a Chinese rotating round table. In the latter case, when there are a large number of thumbnails, the thumbnails are placed in a circle and rotated as shown in FIG. 20G, and when there are a small number of thumbnails, the thumbnails may be preferably placed in a fan shape and moved within a range of the fan shape as shown in FIG. 20H.

3. Individual Space Mode

The individual space mode is for simply integrating the thumbnailed electronic documents as well as collecting the thumbnailed electronic documents in the vicinity of the user himself or herself so as to create a simple individual space. A basic thought thereof is the same as the edge mode and the mode may be implemented in the edge mode.

FIGS. 21A, 21B, 21C, 21D and 21E show operational images in a case where the standby area is realized by the individual space mode.

Figure 21A:
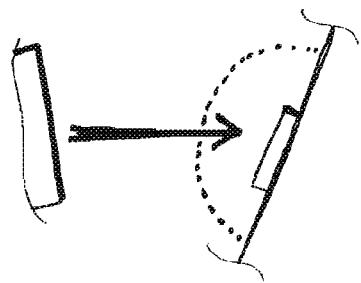
FIGS. 21A, 21B, 21C, 21D and 21E show operational images in a case where the standby area is realized by the mode.
Figure 21B:
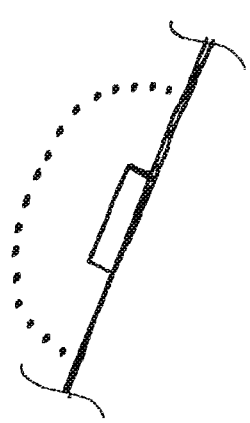
Figure 21C:
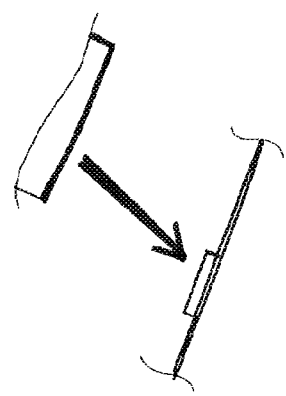
Figure 21D:
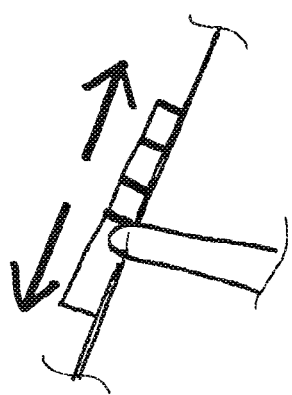
Figure 21E:
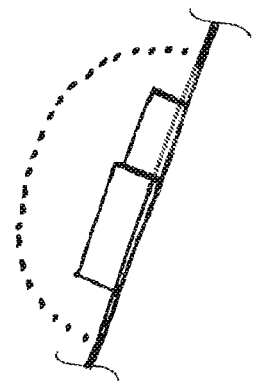

First of all, as shown in FIG. 21A, the electronic document is moved to the edge and thumbnailed. The operation is the same as the edge mode. As shown in FIG. 21B, a take-in area shown by a dotted line is created around the thumbnailed electronic document. In this state, as shown in FIG. 21C, the electronic document within the working area is moved to the inside of the take-in area so that the electronic document is taken in by the take-in area. As shown in FIG. 21D, the thumbnails are integrally expressed by overlapping a part of the thumbnail with another. At this time, the document that is taken in later may be displayed on the very front surface side or the very back side. With regard to the integrated expression of the thumbnails, a whole of the integrated thumbnails may be moved as shown in FIG. 21E.

As for an operation in a case where the order of overlapping is changed, an operation in a case where only one thumbnail among the integrated thumbnails is taken to the working area, and an operation in a case where a whole of the integrated thumbnails is taken to the working area, the same method as shown in "Expression of thumbnail" may be preferably adopted.

A hybrid standby area may be provided by combining the edge mode, the corner mode and the individual space mode.

<Treatment of Associated Document>

Figure 22A:
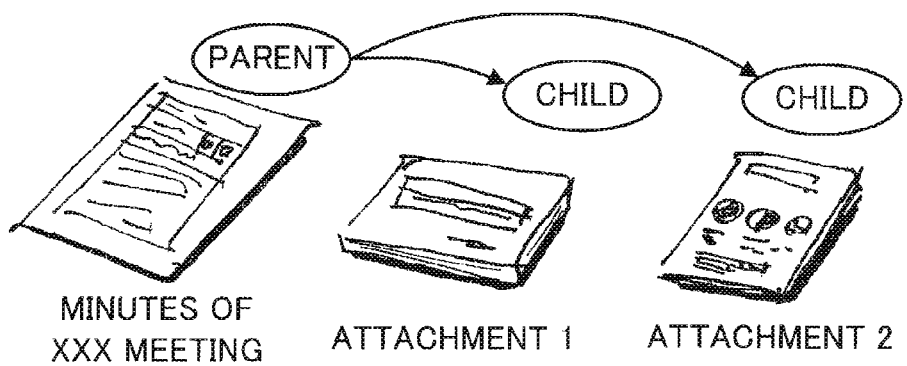
FIGS. 22A to 22C are diagrams showing association of the electronic documents and reflection of the association making the electronic document standby or called back according to the exemplary embodiment.
Figure 22B:
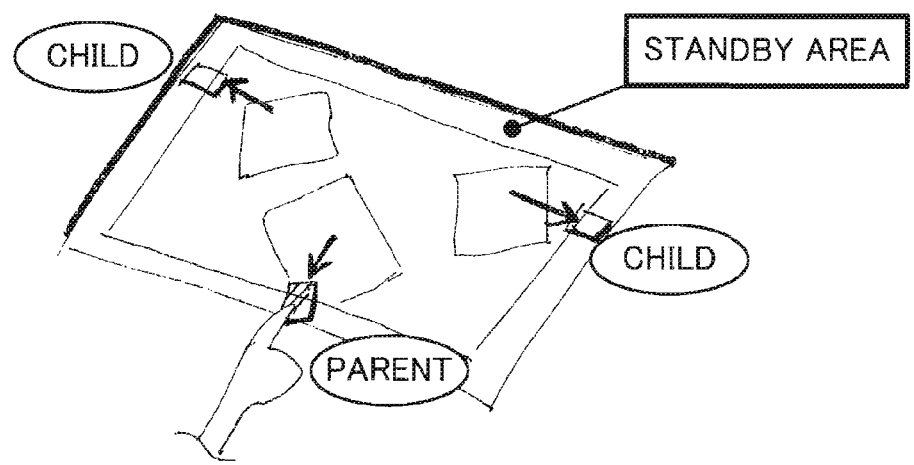
Figure 22C:
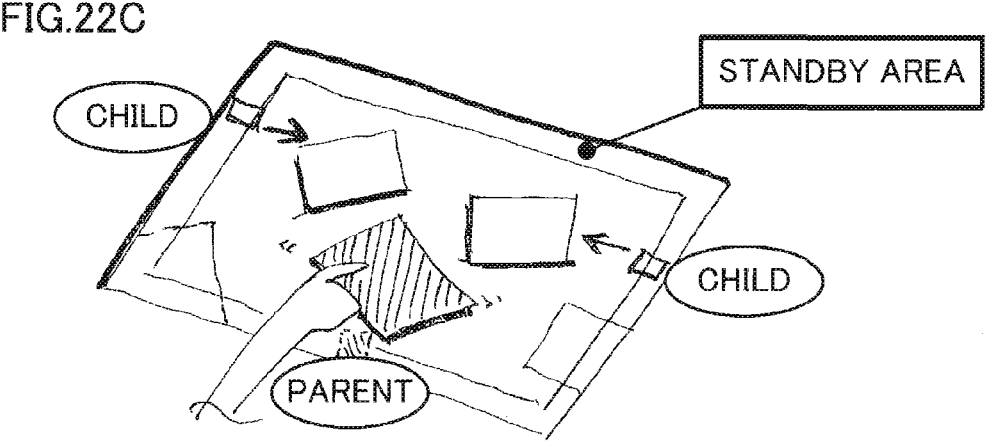

FIGS. 22A to 22C are diagrams showing association of the electronic documents and reflection of the association making the electronic document standby or called back according to the present exemplary embodiment of this invention.

As shown in FIG. 22A, it is considered that plural electronic documents have a parent-child relationship. Although the figure shows a first case where minutes of the meeting are the parent and attached documents are children, the relationship is not limited to the first case. For example, various examples such as a second case where a proposal material is the parent and reference data (reference image data) is the child, and a third case where a document A that is currently used is the parent and a newspaper cutout B that is associated with the document A and a technical explanation C that is associated with the document A are children are considered. Particularly, in the third case, any of documents A, B and C may be the parent. That is, the parent-child relationship described here is not a relationship that uniformly defines which is the parent and which is the child but a relationship in which there is any relationship between the electronic documents.

Here, the parent-child relationship is reflected in the standby and the call-up of the electronic documents.

First of all, a description will be given to the reflection of the parent-child relationship in the standby of the electronic documents.

In this case, as shown in FIG. 22B, a parent electronic document is moved to the standby area and thumbnailed so that children electronic documents are also thumbnailed.

Here, the timing of thumbnailing the children electronic documents may be the same as that of the thumbnailing of the parent electronic document, or slightly later than that of the thumbnailing of the parent electronic document. At this time, in the figure, although the children electronic documents are moved to the nearest edge and thumbnailed, the children electronic documents are not limited to moving to the nearest edge. That is, the children electronic documents may be taken in the same direction as the parent electronic document and integrally displayed. As a thumbnail expression at the time of integrally displaying, a superior-subordinate relation between the parent and the children may be preferably clearly described. For example, the thumbnail of the parent may be displayed popping out slightly over the thumbnails of the children, and the thumbnail of the parent may be displayed slightly more largely than the thumbnails of the children. Alternatively, between the thumbnails, the transparency may be changed (the thumbnails of the children are more transparent), color strength (gradation) may be changed and the brightness may be changed.

Next, a description will be given to the reflection of the parent-child relationship in the call-up of the electronic document.

In this case, as shown in FIG. 22C, the thumbnail of the parent is moved to the working area and displayed as the original image so that the thumbnails of the children are also displayed in the working area as the original images. Here, the timing of the children electronic documents popping out as the original images may be the same as that of the parent electronic document popping out, or slightly later than that of the parent electronic document popping out. At this time, the original image of the parent electronic document may be preferably displayed on the upper side of the original images of the children electronic documents. Alternatively, the original images of the children electronic documents are made slightly transparent (for example, 60% of transparency) so that the original images of the children electronic documents are distinguished from the original image of the parent electronic document. In addition, the size of the original images of the children electronic documents may be slightly smaller than the size of the original image of the parent electronic document (for example, 80% of the size of the parent) so that the children electronic documents are displayed less visibly than the parent. Alternatively, the parent and the children may be differentiated from each other by combining the transparency and the size.

The above description is given to the case where plural electronic documents are in the parent-child relationship. However, a similar display may be conducted irrespective of the parent-child relationship.

For example, although plural electronic documents are divided into groups A, B and C, the original images of the electronic documents are to be displayed on the display screen irrespective of such groups. In such a case, when an original image of an electronic document of the group A is thumbnailed, other electronic documents of the group A may also be thumbnailed.

It is also assumed that plural electronic documents are divided into groups A, B and C, and thumbnails thereof are displayed in the standby area. In such a case, when the thumbnail of the group A is moved to the working area, other electronic documents of the group A may be preferably moved to the working area at an arbitrary timing. At this time, the image of the electronic document may pop out in the vicinity, in a free space, or on the upper side of an occupied space by overlapping the space.

As the group here, there may be thought one based on various things such as a project, a user, a term, a phase and a keyword.

<A Functional Configuration of the Table Type Display Apparatus>

Next, a description will be given to a functional configuration of the table type display apparatus 10 that realizes the display mentioned above.

Figure 23:
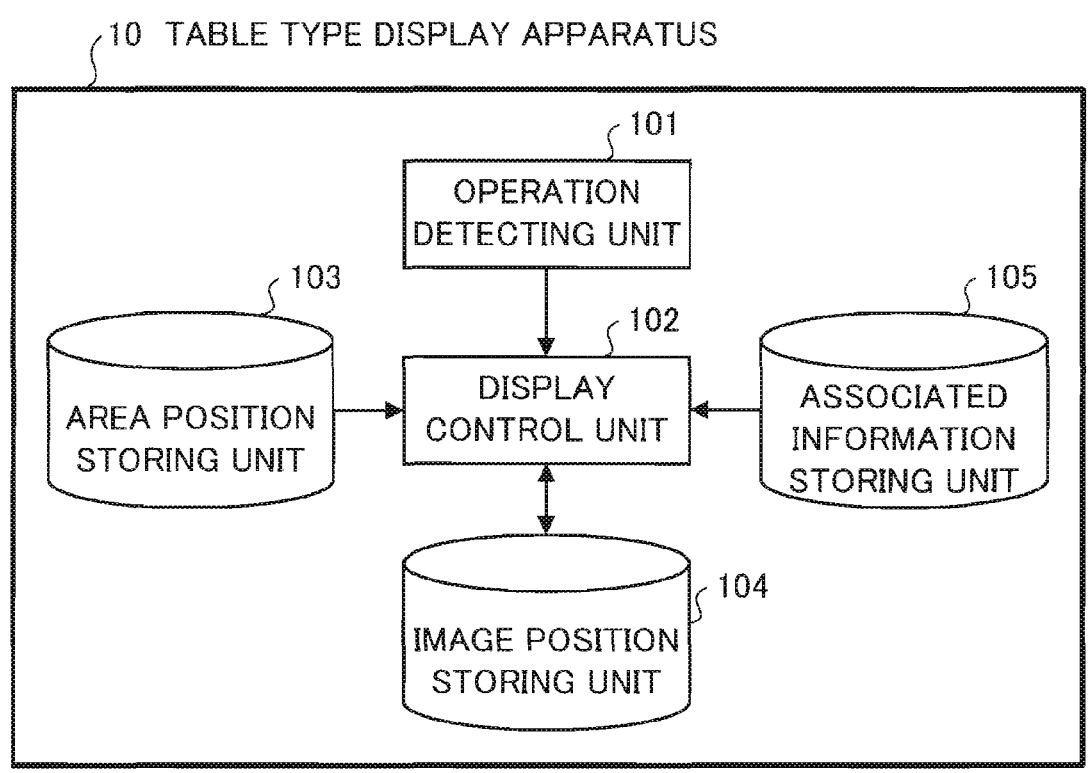
FIG. 23 is a block diagram showing an example of the functional configuration of the table type display apparatus.

FIG. 23 is a block diagram showing an example of the functional configuration of the table type display apparatus 10.

As shown in the figure, the table type display apparatus 10 is provided with an operation detecting unit 101 that detects a user operation on the screen, a display control unit 102 that controls the display on the basis of the user operation on the screen, an area position storing unit 103 that stores information on an area position, an image position storing unit 104 that stores information on an image position, and an associated information storing unit 105 that stores associated information between the electronic documents.

The operation detecting unit 101 detects the user operation by receiving a signal outputted by the touch panel which detects a touch with a finger to the touch panel provided on the tabletop 11 (refer to FIG. 1). That is, in the present exemplary embodiment, the operation detecting unit 101 is provided as an example of a detection unit of the present invention that detects operation. Here, signals related to a touch with a finger include a signal indicating that a finger touches the touch panel (touch ON signal), a signal indicating that the finger moves away from the touch panel (touch OFF signal), and a signal indicating that the finger is dragged on the touch panel (drag signal). Among the signals, the touch ON signal and the touch OFF signal transmit a position which the finger touches and a position which the finger moves away from, respectively. The drag signal transmits a position of a route on which the finger moves during the period from the transmission of the touch ON signal to the transmission of the touch OFF signal at an extremely short interval of time. There is a case where the touch ON signal transmits a sliding operation of the finger. However, in the case, the touch ON signal transmits speed and direction of moving the finger in addition to the position where the finger touches.

The display control unit 102 receives a content of the user operation that is detected by the operation detecting unit 101, performs a process in accordance with the content of the operation, and sends a screen that is obtained as a result of the process to a projector 15 (refer to FIG. 1). By so doing, the screen that is displayed on a tabletop 11 (refer to FIG. 1) is updated. In the present exemplary embodiment, the display control unit 102 is provided as an example of a controller of the present invention that controls various displays.

The area position storing unit 103 stores the information for identifying positions of the working area and the standby area on the screen. The image position storing unit 104 stores the information for identifying a position of the image of the electronic document that is displayed on the screen. At this time, the image position storing unit 104 stores incidental information such as whether the image of the electronic document is original or thumbnailed, and whether or not the image of the electronic document is hidden behind the edge of the screen as described later. Further, the associated information storing unit 105 stores the information for identifying relationship between an electronic document and other electronic document. Although the table type display apparatus 10 is provided with the associated information storing unit 105 here, by separately prepared a server that is accessible from the table type display apparatus 10, a configuration in which the server is provided with the associated information storing unit 105 may be adopted.

Next, a description will be given to a specific example of the information that is stored in the area position storing unit 103, the image position storing unit 104 and the associated information storing unit 105.

Figure 24:
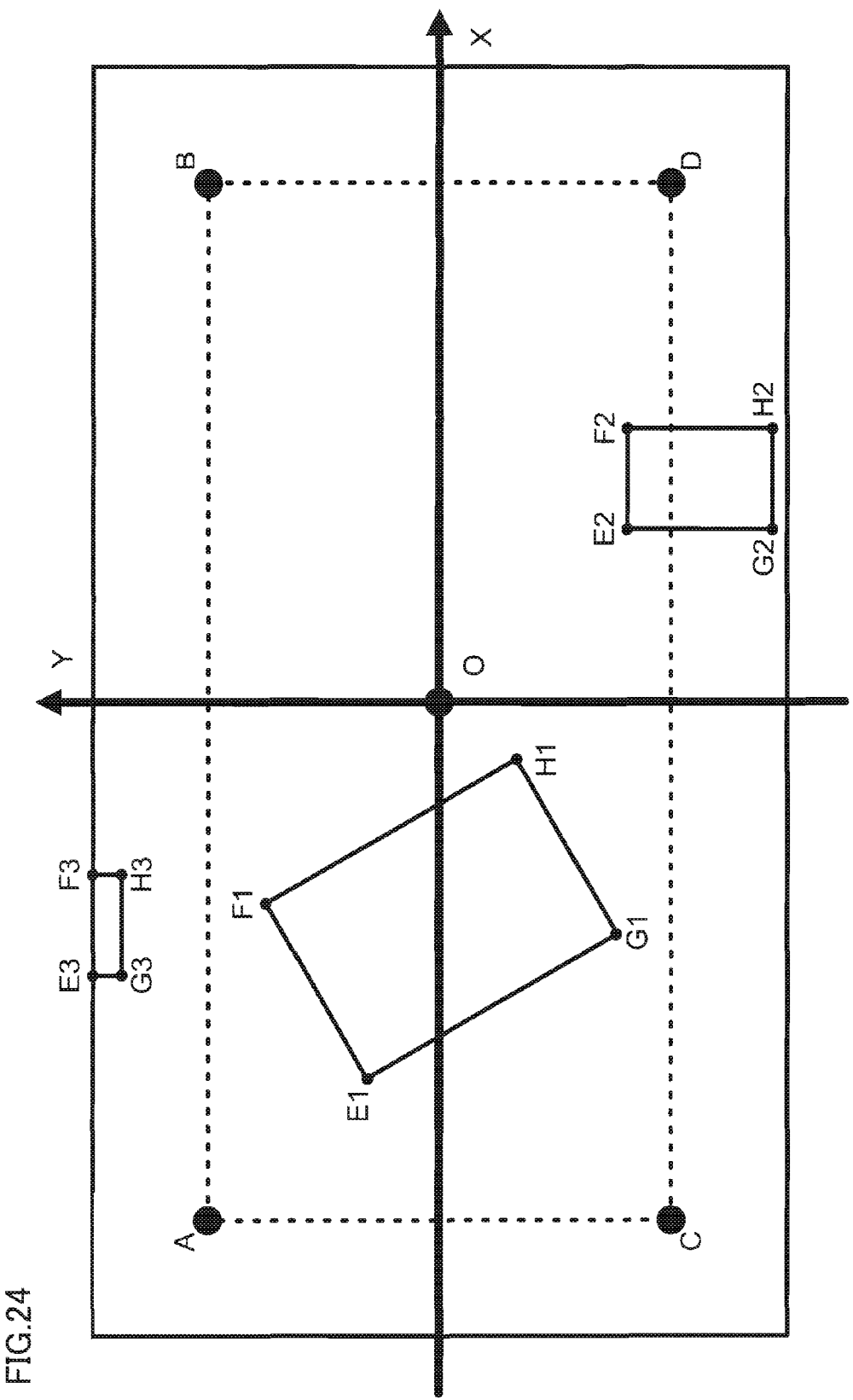
FIG. 24 is a diagram showing a coordinate system used for management of coordinates according to the table type display apparatus of the exemplary embodiment.

Before the description of the specific example, a description will be given to coordinates that are set on the screen of the table type display apparatus 10. FIG. 24 is a diagram showing a coordinate system used for management of coordinates according to the table type display apparatus 10 of the present exemplary embodiment of this invention. FIG. 24 shows the coordinates that are set on the screen. Here, the screen is a rectangle and the center is the origin. An X axis is in the longitudinal direction of the rectangle and a Y axis is in the lateral direction.

First of all, on the screen, the borderline between the working area and the standby area is shown by a tetragon ABCD with a dotted line. That is, the inside of the tetragon ABCD is the working area and the outside of the tetragon ABCD is the standby area.

On the screen, the original image is represented by a tetragon having vertices E1, F1, G1 and H1. Further, the thumbnail entirely shown is represented by a tetragon having vertices E2, F2, G2 and H2. The thumbnail partly shown is represented by a tetragon having vertices E3, F3, G3 and H3.

FIGS. 25A and 25B show the stored contents of the area position storing unit 103 and the image position storing unit 104 respectively in the case where the working area and the standby area are set as mentioned above and the image of the electronic document is displayed as mentioned above. With regard to the coordinates in FIGS. 25A and 25B, the X-coordinate of the point is represented by adding "x" to the end of symbols of vertex in FIG. 24, and the Y-coordinate of the point is represented by adding "y" to the end of symbols of vertex in FIG. 24.

First of all, FIG. 25A is a diagram showing a specific example of information that is stored in the area position storing unit 103. In the case of the example shown in FIG. 24, a rectangular working area is arranged on the center of the screen. Therefore, for example, since a range of the working area and the standby area is identified by storing coordinates of only a left top point and a right bottom point in the working area, the information of the range is stored.

FIG. 25B is a diagram showing a specific example of the information that is stored in the image position storing unit 104. Since the image of the electronic document is not foreseeable to be displayed in any directions on the screen, three coordinates of the left top point, the right top point and the left bottom point are stored. In the figure, an image ID "Q001" represents the original image in FIG. 24, an image ID "Q002" represents the thumbnail entirely shown in FIG. 24 and an image ID "Q003" represents the thumbnail partly shown in FIG. 24. Flags stored in the image position storing unit 104 indicate whether the image is the original image or the thumbnail, and whether the thumbnail is entirely or partly shown. That is, a flag "0" shows the original image, a flag "1" shows the thumbnail that is entirely shown, and a flag "2" shows the thumbnail that is partly shown. In addition, the image position storing unit 104 stores document IDs of the original electronic documents corresponding to each image.

Further, FIG. 25C shows an example of the information that is stored in the associated information storing unit 105.

Here, the figure shows that an electronic document "R001" is associated with electronic documents "R101," "R102" and "R103" and an electronic document "R002" is associated with electronic documents "R201" and "R202."

<An Action of the Table Type Display Apparatus>

Next, a description will be given to an action of the display control unit 102 of the table type display apparatus 10. Although a number of examples are shown up to here, now a description will be given to the action of the display control unit 102 on the basis of the basic manners in FIGS. 3 and 4 in the case where FIGS. 5A, 11, 22 and the like are applied as additional requirements.

Figure 26:
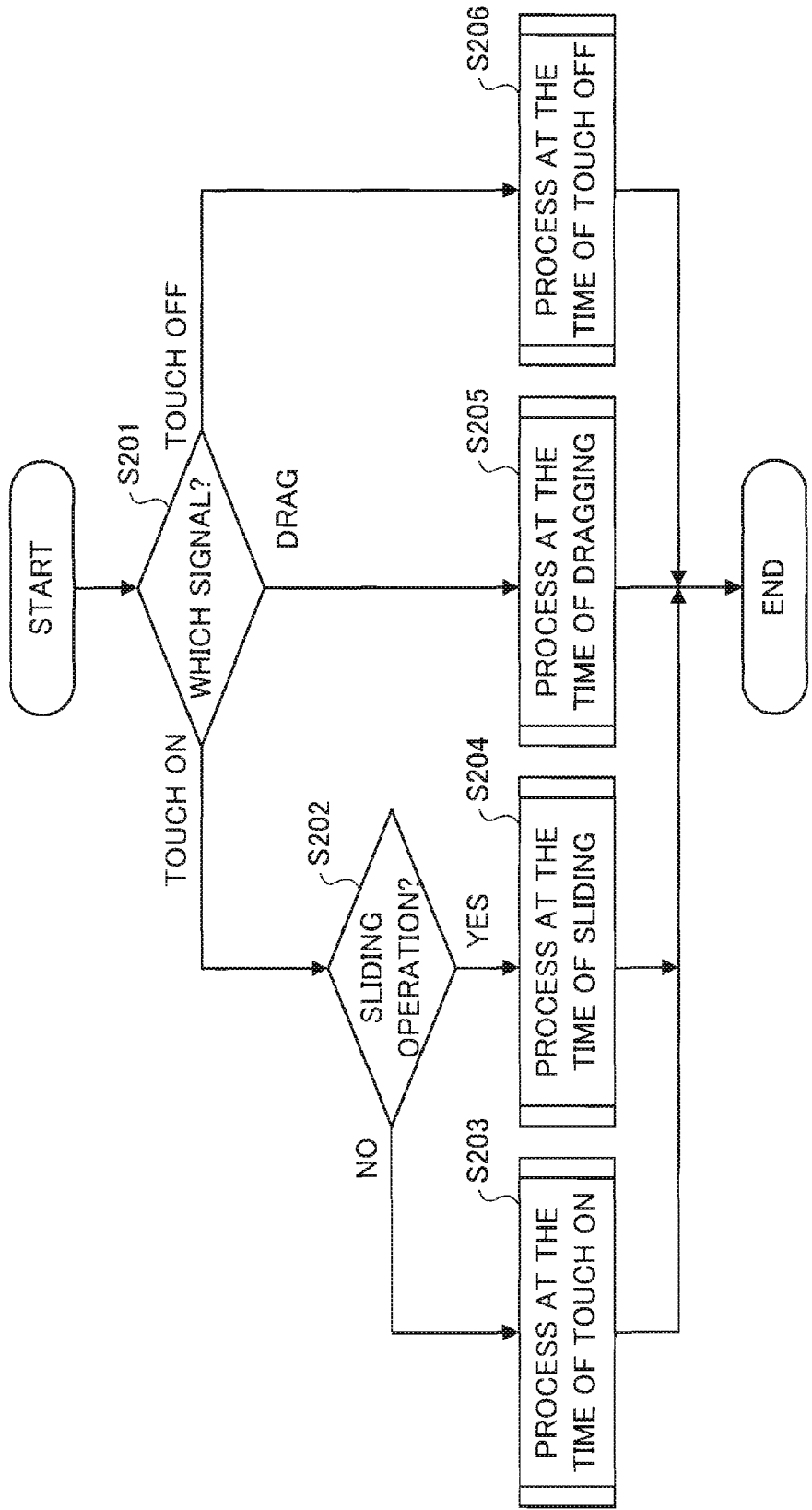
FIG. 26 is a flowchart showing a main action of the display control unit.

FIG. 26 is a flowchart showing a main action of the display control unit 102.

When the display control unit 102 receives a signal from the operation detecting unit 101, the display control unit 102 determines whether the signal is a touch ON signal, a touch OFF signal or a drag signal (step 201).

When the signal is the touch ON signal, it is determined whether the touch is a sliding operation or not (step 202). When the touch is not the sliding operation, a process at the time of touch ON described later is performed (step 203). When the touch is the sliding operation, a process at the time of sliding described later is performed (step 204).

In addition, when the signal is the drag signal, a process at the time of dragging described later is performed (step 205).

Further, when the signal is the touch OFF signal, a process at the time of touch OFF described later is performed (step 206).

First of all, a description will be given to the process at the time of touch ON. The process at this time corresponds to the process described above with reference to FIG. 4A.

Figure 27:
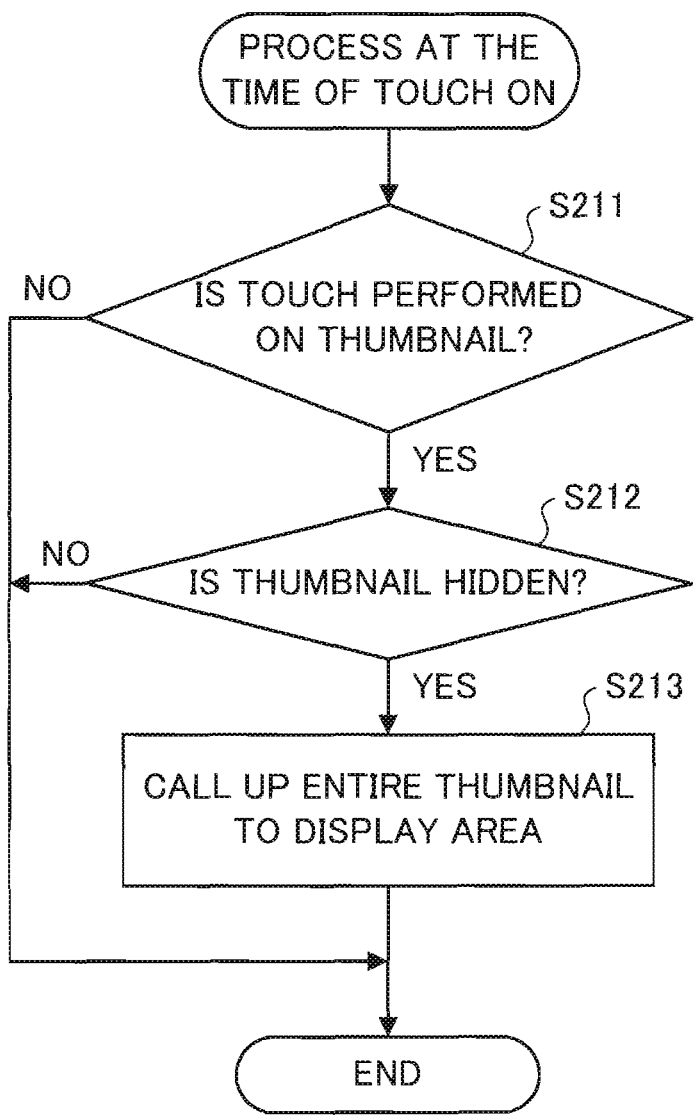

FIG. 27 is a flowchart showing a flow of the process at the time of touch ON.

The display control unit 102, first of all, determines whether the touch is performed on the thumbnail or not (step 211). Specifically, it is determined whether or not the touch position transmitted with the touch ON signal is within the range of the thumbnail. That is, referring to the image position storing unit 104, it is determined whether or not the image range identified by coordinates information includes the touch position, and whether or not there is an image having the flag of "1" or "2." In this case, by determining whether or not a range that is slightly larger than the image range identified by the coordinates information includes the touch position, such actions shown in FIGS. 7B to 7D may be performed.

When the touch is not performed on the thumbnail, the process ends. This is because the touch performed on the original image only indicates selection of the original image but not changes the display state at all.

When the touch is performed on the thumbnail, it is determined whether or not the thumbnail is hidden behind the edge of the screen (step 212). Specifically, referring to the image position storing unit 104, it is determined whether the flag corresponding to the image identified in step 211 is "1" or "2."

When it is determined that the thumbnail is not hidden behind the edge of the screen as a result, in other words, when the flag is "1," the process ends. This is because here the process is on the premise of the manner that the thumbnail hidden behind the edge of the screen is called up and dragged, although the thumbnail entirely shown may be touched and hidden behind the edge of the screen conversely.

Meanwhile, when it is determined that the thumbnail is hidden behind the edge of the screen, in other words, when the flag is "2," the entire thumbnail is called up to the display area (step 213). Specifically, in the image position storing unit 104, the coordinates information of the image identified in step 211 is updated to coordinates information in the case of showing the entire thumbnail, and the flag is changed to "1."

Next, a description will be given to the process at the time of sliding. The process at this time corresponds to the process described above with reference to FIG. 11.

Figure 28:
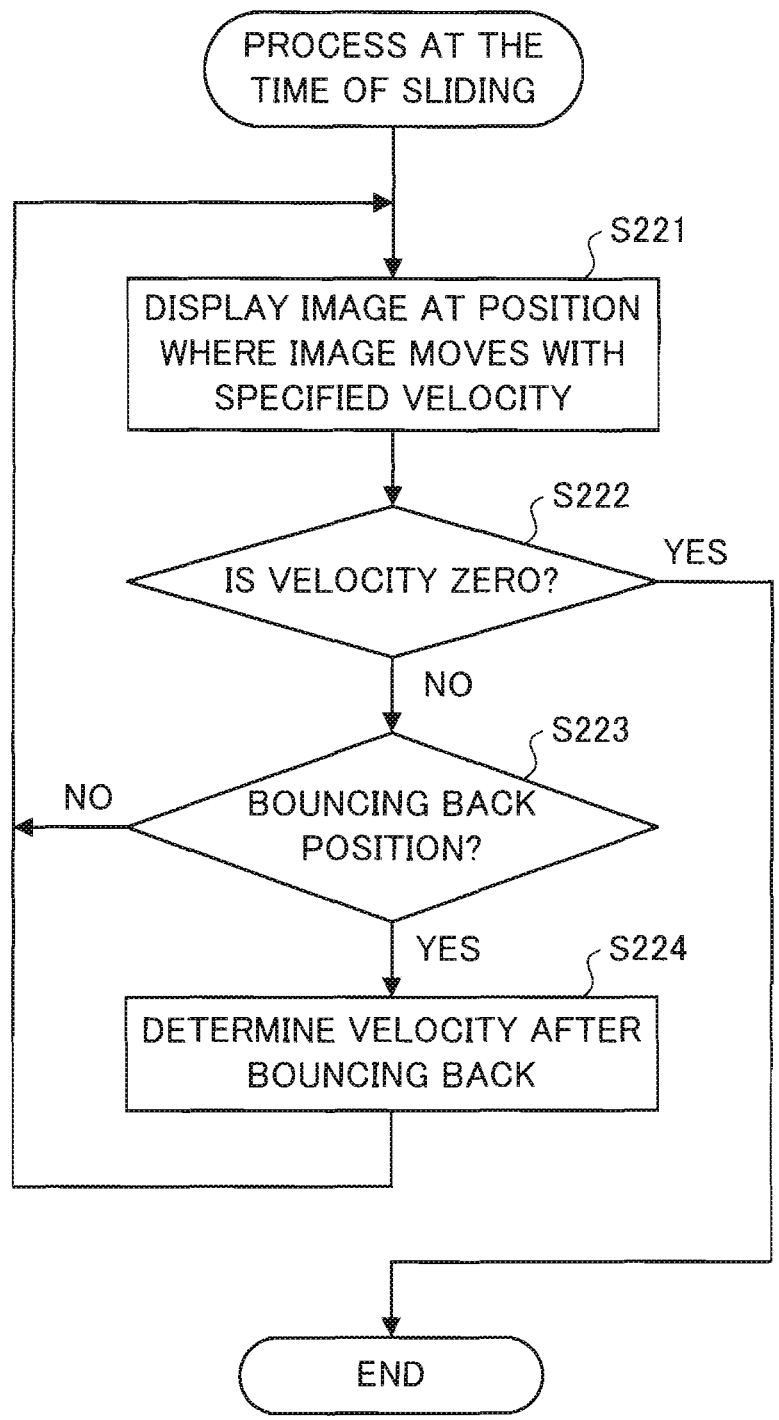
FIG. 28 is a flowchart showing a flow of the process at the time of sliding.

FIG. 28 is a flowchart showing a flow of the process at the time of sliding.

When the sliding operation is performed, velocity (speed and direction) of the sliding operation is transmitted to the display control unit 102 in addition to the touch position. First of all, the display control unit 102 displays the image at a position where the image moves with specified velocity for a fixed time (step 221). For example, provided the initial velocity (V cos θ, V sin θ), accelerated velocity (−A cos θ, −A sin θ) and coordinates (X (t), Y (t)) when elapsed time after the touch is t, the coordinates of the touch position are (X (0), Y (0)). Then, they lead the following equations:

$$X(t)=X(0)+V\cos\theta \cdot t - A\cos\theta \cdot t^2/2$$

$$Y(t)=Y(0)+V\sin\theta \cdot t - A\sin\theta \cdot t^2/2$$

However, the accelerated velocity A is a value that is preset as an attribute of the screen of the table type display apparatus 10. In step 221, the coordinates information in the image position storing unit 104 is updated in accordance with the equations.

When the image is slid as mentioned above, the velocity may finally become zero as the accelerated velocity is in a direction opposite to the moving direction. Therefore, the display control unit 102 determines whether the velocity becomes zero or not (step 222).

When the velocity is zero, the process ends.

When the velocity is not zero, the image may reach the bouncing back position. Therefore, the display control unit 102 determines whether or not the image reaches the bouncing back position (step 223). In this case, any bouncing back positions shown in FIGS. 11B to 11D may be adopted as the bouncing back position.

When the image does not reach the bouncing back position as a result, the flow returns to step 221, the velocity at the time is reset to the "specified velocity," and the process following is repeated.

Meanwhile, when the image reaches the bouncing back position, the display control unit 102 determines the velocity after bouncing back (step 224). In this case, the velocity after bouncing back may be determined by retaining the parallel component of the velocity before bouncing back to the edge of the screen and reversing the direction of the perpendicular component of the velocity before bouncing back to the edge of the screen while retaining value of the perpendicular component of the velocity before bouncing back. When the velocity after bouncing back is determined as described above, the flow returns to step 221, the determined velocity is reset to the "specified velocity," and the process following is repeated.

Although the sliding operation is performed in the manner above described with reference to FIGS. 8F and 8G, the process in this case is omitted here.

Next, a description will be given to the process at the time of dragging. The process at this time corresponds to the process described above with reference to FIGS. 3A, 5A, 7A, 10A and the like.

Figure 29:
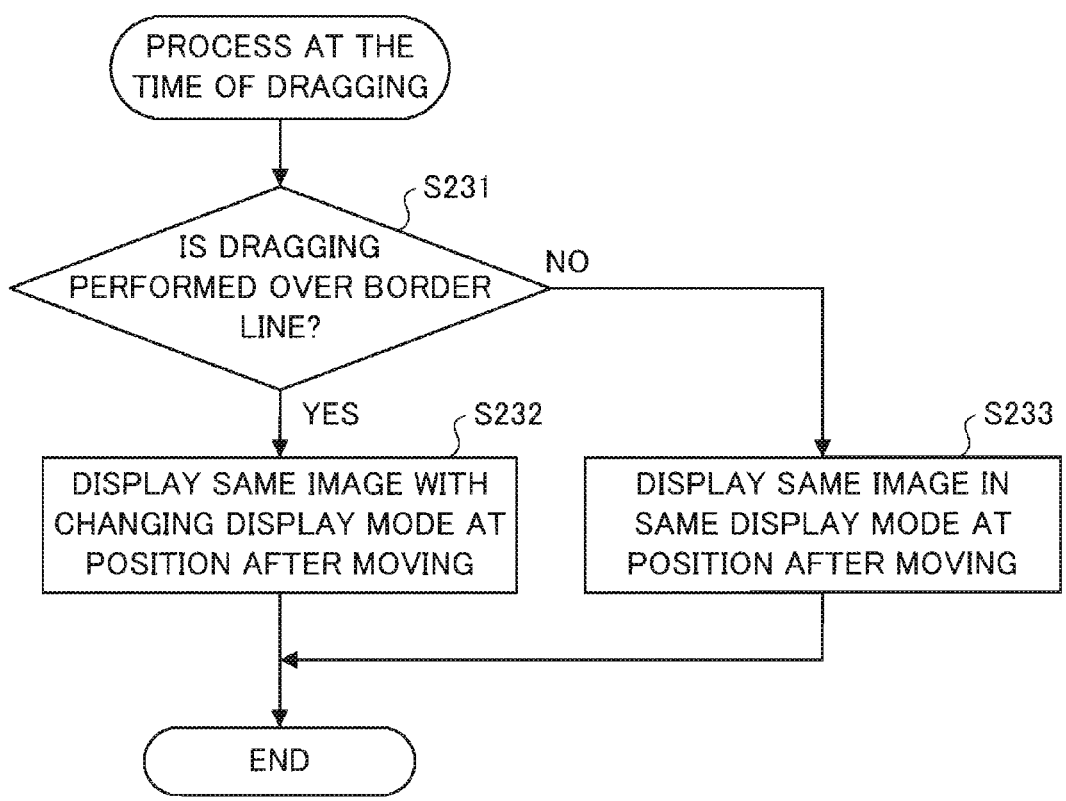
FIG. 29 is a flowchart showing a flow of the process at the time of dragging.

FIG. 29 is a flowchart showing a flow of the process at the time of dragging.

The display control unit 102, first of all, determines whether or not the dragging is performed over the borderline between the working area and the standby area (step 231). Specifically, it is determined whether or not the touch position transmitted with the drag signal is moved from the inside of the standby area to the inside of the working area, or whether or not the touch position is moved from the inside of the working area to the inside of the standby area. That is, referring to the area position storing unit 103, it is determined whether or not the touch position is moved from the outside to the inside of the area range determined by the coordinates information, or whether or not the touch position is moved from the inside to the outside.

When the dragging is performed over the borderline, at a position after the moving, the same image is displayed with changing the display mode (step 232). The display mode here includes blinking, transparency, change in size, change in color and the like as described above with reference to FIG. 5A. It should be noted that in step 232, the coordinates information in the image position storing unit 104 is updated.

When the dragging is not performed over the borderline, at the position after the moving, the same image is displayed in the same display mode (step 233). By so doing, the display as shown in FIGS. 3A, 7A and 10A is realized. In step 233, the coordinates information in the image position storing unit 104 is also updated.

Finally, a description will be given to the process at the time of touch OFF. The process at this time corresponds to the process described above with reference to FIGS. 3B, 3C, 4B, 22 and the like.

Figure 30:
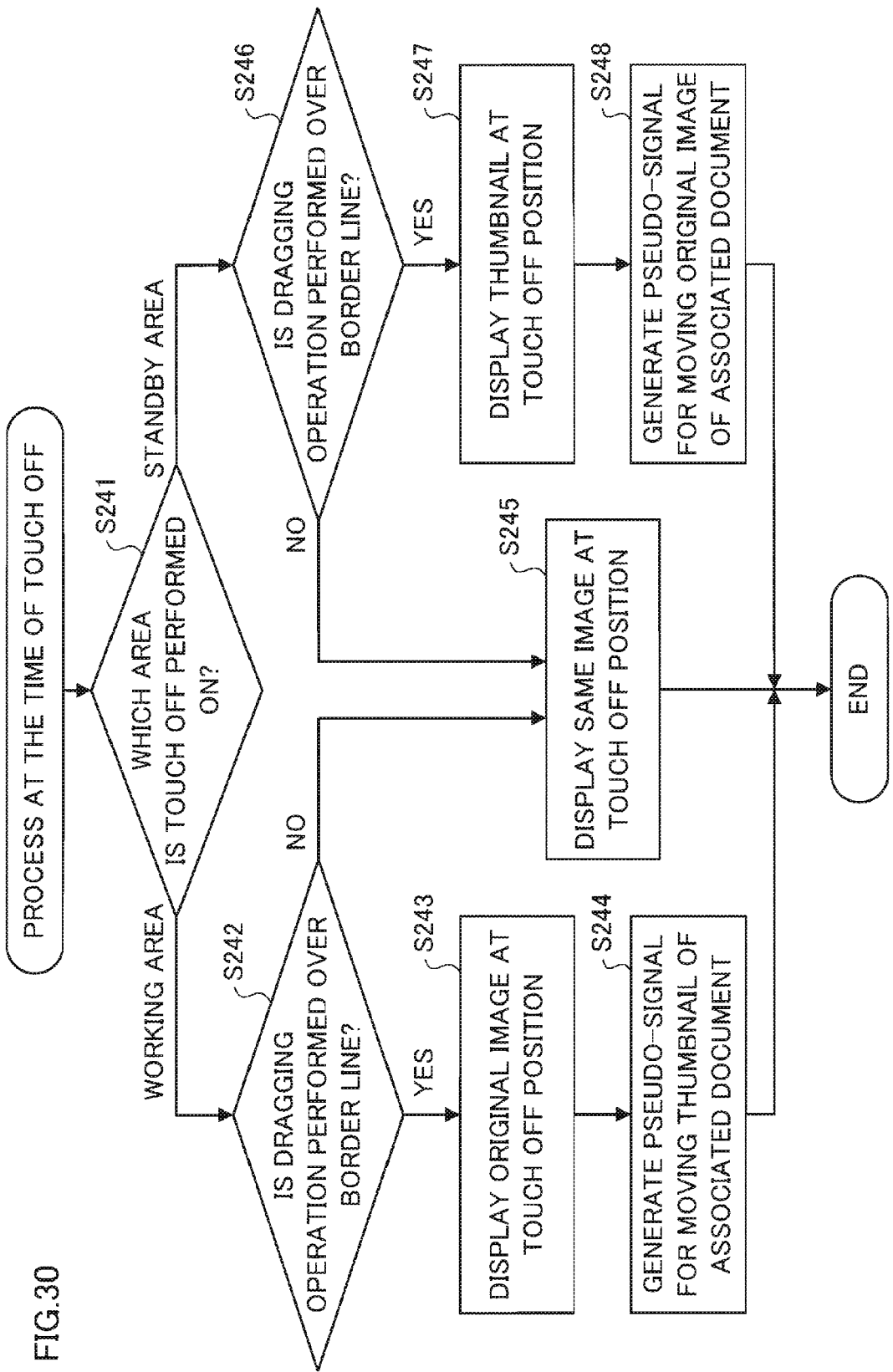
FIG. 30 is a flowchart showing a flow of the process at the time of touch OFF.

FIG. 30 is a flowchart showing a flow of the process at the time of touch OFF.

The display control unit 102, first of all, determines whether the touch OFF is performed on the working area or the standby area (step 241). Specifically, it is determined whether the position (touch OFF position) where the finger is removed from an image, in accordance with information of the touch OFF position transmitted with the touch OFF signal, is within the range of the standby area or the range of the working area. That is, referring to the area position storing unit 103, it is determined whether the touch OFF position is inside or outside of the area range determined by the coordinates information.

When the touch OFF is performed within the working area, the display control unit 102 determines whether or not the dragging operation that is already done is performed over the borderline between the working area and the standby area (step 242). Specifically, the touch position transmitted with the drag signal is accumulated in the memory (not shown in the figure), and with regard to the accumulated information on the touch position, the same determination is performed as in step 231 of FIG. 29.

When it is determined that the dragging operation that is already done is performed over the borderline as a result, the original image is displayed at the touch OFF position (step 243). Specifically, in the image position storing unit 104, the coordinates information of the image to be operated is updated and the flag is changed to "0."

In the present exemplary embodiment, with regard to other electronic document (associated document) that is associated with the electronic document whose display is switched from the thumbnail to the original image in step 243, as shown in FIG. 22C, the display thereof is also switched from the thumbnail to the original image. That is, a pseudo-signal for moving the thumbnail of the associated document from the standby area to the working area is generated and an action conforming to the pseudo-signal is performed (step 244). Specifically, first of all, referring to the image position storing unit 104, a document ID corresponding to the image to be operated is acquired. Then, referring to the associated information storing unit 105, a document ID of the associated document corresponding to the electronic document of the above document ID is acquired. Referring to the image position storing unit 104 again, the coordinates information on the image corresponding to the document ID of the associated document is updated, and the flag is changed to "0."

Meanwhile, when it is determined that the dragging operation that is already done is not performed over the borderline, the same image is displayed at the touch OFF position (step 245). Specifically, in the image position storing unit 104, the coordinates information of the image to be operated is updated.

When the touch OFF is performed within the standby area, the display control unit 102 also determines whether or not the dragging operation that is already done is performed over the borderline between the working area and the standby area (step 246). Specifically, the touch position transmitted with the drag signal is accumulated in the memory (not shown in the figure) and with regard to the accumulated information on the touch position, the same determination is performed as in step 231 of FIG. 29.

When it is determined that the dragging operation that is already done is performed over the borderline as a result, the thumbnail that is partly hidden behind the edge of the screen is displayed at the touch OFF position (step 247). Specifically, in the image position storing unit 104, the coordinates information of the image to be operated is updated and the flag is changed to "2."

In the present exemplary embodiment, with regard to the associated document that is associated with the electronic document of which display is switched from the original image to the thumbnail in step 247, as shown in FIG. 22B, the display thereof is also switched from the original image to the thumbnail. That is, a pseudo-signal for moving the original image of the associated document from the working area to the standby area is generated and an action conforming to the pseudo-signal is performed (step 248). Specifically, first of all, referring to the image position storing unit 104, a document ID corresponding to the image to be operated is acquired. Then, referring to the associated information storing unit 105, a document ID of the associated document corresponding to the electronic document of the above document ID is acquired. Referring to the image position storing unit 104 again, the coordinates information on the image corresponding to the document ID of the associated document is updated, and the flag is changed to "2."

Meanwhile, when it is determined that the dragging operation that is already done is not performed over the borderline, the same image is displayed at the touch OFF position (step 245). Specifically, in the image position storing unit 104, the coordinates information of the image to be operated is updated.

As a variant example of the present exemplary embodiment, the case where the thumbnail standing by in the standby area of the table type display apparatus 10 follows a user who conducts the standby operation within the standby area is considered.

Figure 31A:
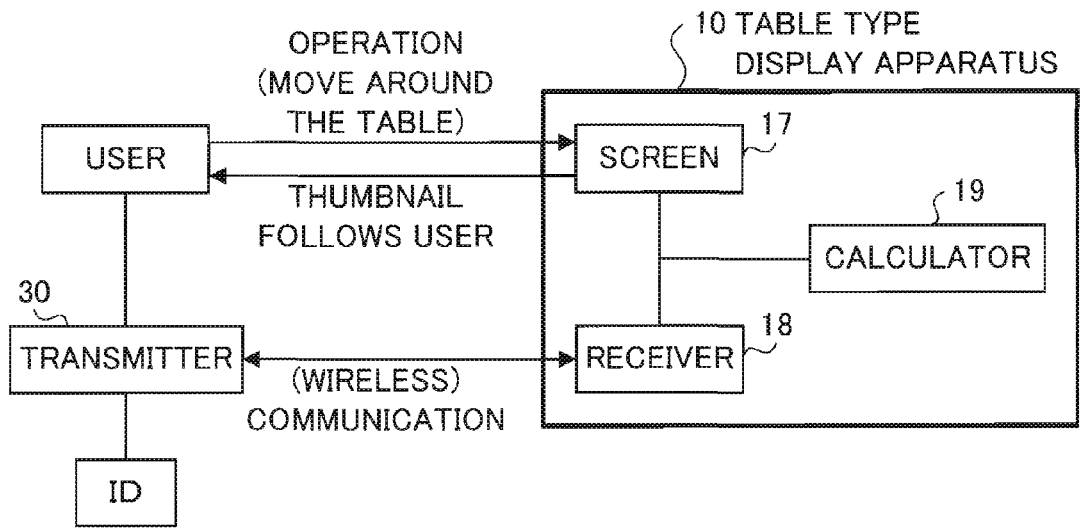
FIGS. 31A and 31B are diagrams showing that the user is followed by the thumbnail in the case where the user moves around the table type display apparatus according to the exemplary embodiment.
Figure 31B:
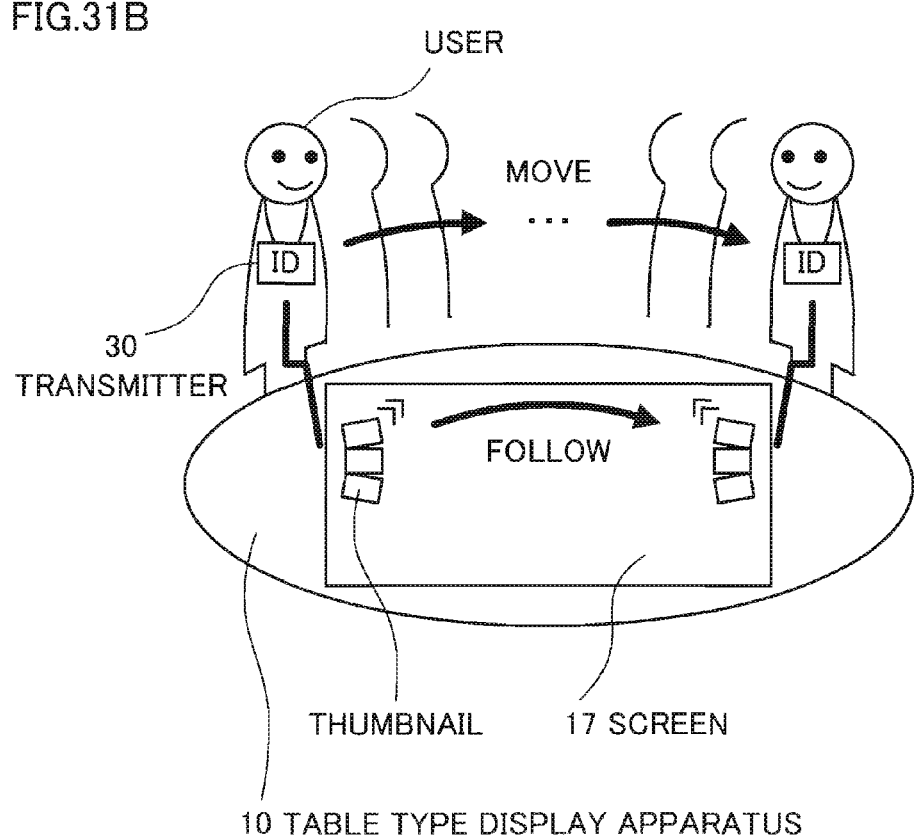

FIGS. 31A and 31B are diagrams showing that a user is followed by the thumbnail in the case where the user moves around the table type display apparatus 10 according to the present exemplary embodiment of this invention. FIG. 31A shows a system configuration for realizing the variant example. The user has a transmitter 30 that performs wireless communication of the ID. The table type display apparatus 10 is provided with a screen 17 that displays the thumbnail, receivers 18 that are arranged at a predetermined interval around the screen 17, and a calculator 19 that calculates the display position of the thumbnail on the screen 17 on the basis of the information received by the receivers 18.

By such a configuration, the thumbnail on the screen 17 is to follow the user who moves around the table type display apparatus 10 as shown in FIG. 31B.

As a specific mechanism, for example, the following may be preferably adopted.

First of all, the thumbnail on the screen 17 is associated with the user who conducts the standby operation when the thumbnail stands by in the standby area. Various methods for identifying the user who conducts the standby operation are thought in this case. For example, there is a method for identifying the user by dividing the standby area, assigning the divided standby area to each user, and then specifying divided standby area in which the thumbnail stands by. In a state that the standby operation of the thumbnail is only conducted by a creator of the original electronic document, it may be thought that the user who conducts the standby operation is identified by referring to information on the creator of the electronic document.

It is assumed that the user moves around the table type display apparatus 10 in a state where the thumbnail is thus associated with the user. Then, the standing position of the user is identified by the wireless communication of the ID by the transmitter 30 and the receivers 18. The calculator 19 controls the display to display the thumbnail that is associated with the user in the standby area that is the nearest to the standing position of the user.

Finally, a description will be given to an example of a hardware configuration of a computer 90 that is for realizing the present exemplary embodiment.

Figure 32:
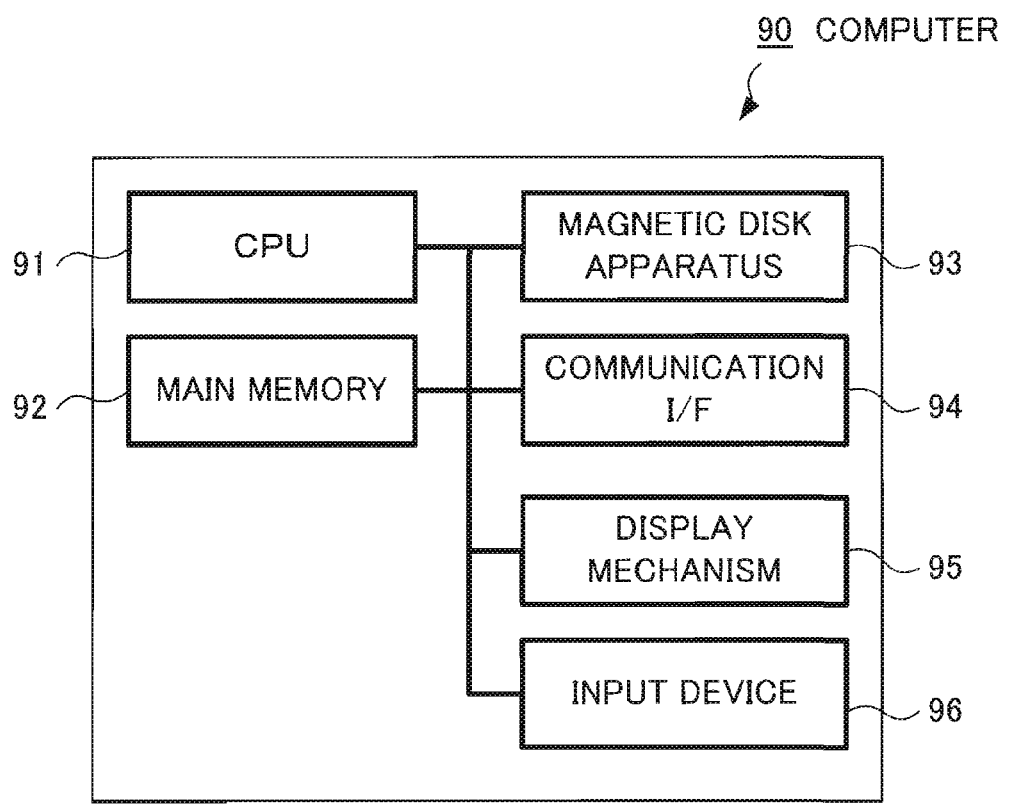
FIG. 32 is a diagram showing the hardware configuration of the computer.

FIG. 32 is a diagram showing the hardware configuration of the computer 90.

As shown in the figure, the computer 90 is provided with a CPU (Central Processing Unit) 91, and a main memory 92 and a magnetic disk apparatus (HDD: Hard Disk Drive) 93 that are storage devices. Here, the CPU 91 executes OS (Operating System) and various kinds of software such as applications and realizes various functions described above. The main memory 92 is a memory area that stores various kinds of software, data used for executing the software and the like. The magnetic disk apparatus 93 has a memory area that stores input data to various kinds of software, output data from various kinds of software and the like.

Further, the computer 90 is provided with a communication I/F 94 that performs communication with external devices, a display mechanism 95 including a video memory, a display and the like, and an input device 96 such as a keyboard, the mouse or the like.

The program that realizes the present exemplary embodiment may be provided not only by a communication device but also by being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display apparatus comprising:
a display that displays a raw image and an identification image within a screen including at least a first area and a second area so as to allow a plurality of users to operate the raw image and the identification image from a plurality of directions, the first area being capable of displaying a plurality of the raw images respectively representing contents of a plurality of electronic documents, the second area being capable of displaying the identification image by which a corresponding one of the electronic documents is identifiable, the identification image being a thumbnail image of the corresponding one of the electronic documents, the identification image being displayed in the second area so that most of the thumbnail image is hidden behind an edge of the display and a remaining portion of the thumbnail image is displayed in the second area;
a detection unit that detects a moving operation of one of the raw images displayed in the first area to the second area; and
a controller that controls the display to display in the second area the identification image, corresponding to one of the raw images displayed in the first area, instead of the one of the raw images in response to the detection by the detection unit, wherein
the detection unit detects the moving operation when a point of the raw image is included in the second area, and the controller controls the display such that, if the moving operation is a dragging of the raw image, the raw image becomes the thumbnail image, and if the moving operation is a sliding of the raw image, the raw image does not become the thumbnail image, but instead is bounced back to the first area without being displayed in the second area.

2. The display apparatus according to claim 1, wherein the detection unit detects the moving operation when a specified point in the raw image is included in the second area.

3. The display apparatus according to claim 1, wherein the detection unit detects the moving operation when a predetermined event generates in a state where a specified point in the raw image is included in the second area.

4. The display apparatus according to claim 1, wherein the controller controls the display to partly display the identification image.

5. The display apparatus according to claim 1, wherein the controller is configured to rotate the identification image when the identification image is moved into, and displayed in, the second area such that a longitudinal axis or a latitudinal axis of the identification image is substantially perpendicular to an edge of the screen.

6. The display apparatus according to claim 1, wherein the controller controls the display to display the identification image at a position that is determined in accordance with a mode of the moving operation.

7. The display apparatus according to claim 1, wherein, when the display displays the identification image in the second area, the controller controls the display to display a second identification image in the second area, the second identification image corresponding to a second raw image displayed in the first area, and the second raw image representing a content of a second electronic document associated with the electronic document identified by the identification image.

8. The display apparatus according to claim 1, wherein the controller controls the display to display the identification image at a position that is determined in correspondence with a position of a person who performs the moving operation.

9. The display apparatus according to claim 1, wherein the detection unit further detects a returning operation of the identification image displayed in the second area to the first area; and
the controller controls the display to display the raw image in the first area in response to detection of the returning operation by the detection unit.

10. A displaying method comprising:
displaying a raw image in a first area among at least two areas within a screen so as to allow a plurality of users to operate the raw image from a plurality of directions, the first area being capable of displaying a plurality of the raw images respectively representing contents of a plurality of electronic documents;
detecting a moving operation of one of the raw images displayed in the first area to a second area that is different from the first area;
displaying an identification image by which a corresponding one of the electronic documents is identifiable in the second area in response to the detection of the moving operation, the identification image corresponding to one of the raw images in the first area and being displayed instead of the one of the raw images, the identification image being a thumbnail image of the corresponding one of the electronic documents, the identification image being displayed in the second area so that most of the thumbnail image is hidden behind an edge of the display and a remaining portion of the thumbnail image is displayed in the second area; and
detecting the moving operation when a point of the raw image is included in the second area, and controlling the display such that, if the moving operation is a dragging of the raw image, the raw image becomes the thumbnail image, and if the moving operation is a sliding of the raw image, the raw image does not become the thumbnail image, but instead is bounced back to the first area without being displayed in the second area.

11. A non-transitory computer readable medium storing a program causing a computer to execute a process for displaying an image, the process comprising:
displaying a raw image in a first area among at least two areas within a screen so as to allow a plurality of users to operate the raw image from a plurality of directions, the first area being capable of displaying a plurality of the raw images respectively representing contents of a plurality of electronic documents;
detecting a moving operation of one of the raw images displayed in the first area to a second area that is different from the first area;
displaying an identification image by which a corresponding one of the electronic documents is identifiable in the second area in response to the detection of the moving operation, the identification image corresponding to one of the raw images in the first area and being displayed instead of the one of the raw images, the identification image being a thumbnail image of the corresponding one of the electronic documents, the identification image being displayed in the second area so that most of the thumbnail image is hidden behind an edge of the display and a remaining portion of the thumbnail image is displayed in the second area; and
detecting the moving operation when a point of the raw image is included in the second area, and controlling the display such that, if the moving operation is a dragging of the raw image, the raw image becomes the thumbnail image, and if the moving operation is a sliding of the raw image, the raw image does not become the thumbnail image, but instead is bounced back to the first area without being displayed in the second area.

12. The computer readable medium according to claim 11, wherein the process of detecting the moving operation detects the moving operation when a specified point in the raw image is included in the second area.

13. The computer readable medium according to claim 11, wherein the process of detecting the moving operation detects the moving operation when a predetermined event generates in a state where a specified point in the raw image is included in the second area.

14. The computer readable medium according to claim 11, wherein the process of displaying the identification image is to partly display the identification image.

15. The computer readable medium according to claim 11, wherein the process of displaying the identification image is to display the identification image such that the identification image is rotated when the identification image is moved into, and displayed in, the second area such that a longitudinal axis or a latitudinal axis of the identification image is substantially perpendicular to an edge of the screen.

16. The computer readable medium according to claim 11, wherein the process of displaying the identification image is to display the identification image at a position that is determined in accordance with a mode of the moving operation.

17. The computer readable medium according to claim 11, wherein, when the identification image is displayed in the second area, the process of displaying the identification image displays a second identification image in the second area, the second identification image corresponding to a second raw image displayed in the first area, and the second raw image representing a content of a second electronic document associated with the electronic document identified by the identification image.

18. The computer readable medium according to claim 11, wherein the process of displaying the identification image is to display the identification image at a position that is determined in correspondence with a position of a person who performs the moving operation.

19. The computer readable medium according to claim 11, wherein
the process of detecting the moving operation is to further detect a returning operation of the identification image displayed in the second area to the first area; and
the process of displaying the raw image is to display the raw image in the first area in response to detection of the returning operation.

20. The display apparatus according to claim 1, wherein the identification image is smaller than the raw image.

21. The display apparatus according to claim 1, wherein a size of the identification image is equalized to a fixed height or width.

22. The display apparatus according to claim 1, wherein the controller controls the display such that the identification image at least partially overlaps another identification image and the identification image is integrated with the another identification image.

23. The display apparatus according to claim 1, wherein the controller controls the display of the identification image such that a transparency or virtual expression of a depth of the identification image is changed based on an importance or a current need for the identification image.

24. The computer readable medium according to claim 11, wherein the identification image is smaller than the raw image.

25. The computer readable medium according to claim 11, wherein a size of the identification image is equalized to a fixed height or width.

26. The computer readable medium according to claim 11, wherein the identification image is displayed such that the identification image at least partially overlaps another identification image and the identification image is integrated with the another identification image.

27. The computer readable medium according to claim 11, wherein the identification image is displayed such that a transparency or virtual expression of a depth of the identification image is changed based on an importance or a current need for the identification image.

28. A display apparatus comprising:
a display that includes a first display area configured to display a first image representing a content of an electronic document, and a second display area;
a detection unit that detects a moving operation of one of the first image from the first display area to the second display area, the moving operation being performed by a moving operation of the user; and
a controller that controls, upon detection of the moving operation of the first image, the first image to become a second image which is smaller than the first image and represents a thumbnail image of the electronic document, and controls the second display area to display the second image, wherein
the controller controls, if the moving operation is a dragging of the first image, the first image to become the second image, and controls, if the moving operation is a sliding of the first image, the first image to not become the second image but instead to bounce back to the first display area, without being displayed in the second display area.

29. The display apparatus according to claim 28, wherein the detection unit detects the moving operation when a point of the first image is included in the second display area.

30. The display apparatus according to claim 28, wherein the second display area displays the second image so that most of the second image is hidden behind an edge of the display and a remaining part of the second image is displayed in the second display area.

* * * * *